(12) United States Patent
Socci et al.

(10) Patent No.: US 8,095,010 B2
(45) Date of Patent: Jan. 10, 2012

(54) METHOD AND DEVICE FOR TUNABLE OPTICAL FILTERING

(75) Inventors: Luciano Socci, Milan (IT); Paola Galli, Milan (IT); Silvia Ghidini, Milan (IT); Marco Romagnoli, Milan (IT)

(73) Assignee: Mosaid Technologies Incorporated, Ottawa, Ontario ( * ) Notice: Subject to any disclaimer, the term of this patent is extended or adjusted under 35 U.S.C. 154(b) by 779 days.

(21) Appl. No.: 12/087,063

(22) PCT Filed: Dec. 28, 2005

(86) PCT No.: PCT/EP2005/014092
§ 371 (c)(1),
(2), (4) Date: Jun. 25, 2008

(87) PCT Pub. No.: WO2007/073763
PCT Pub. Date: Jul. 5, 2007

(65) Prior Publication Data
US 2009/0028567 A1    Jan. 29, 2009

(51) Int. Cl.
*H04J 14/02* (2006.01)
(52) U.S. Cl. .......................................... 398/85
(58) Field of Classification Search .............. 398/83, 398/85
See application file for complete search history.

(56) References Cited

U.S. PATENT DOCUMENTS

| | | | |
|---|---|---|---|
| 6,832,027 B2 * | 12/2004 | Wada et al. | 385/37 |
| 6,839,482 B2 | 1/2005 | Margalit | |
| 2005/0265720 A1 | 12/2005 | Ling et al. | |
| 2007/0140700 A1 * | 6/2007 | Vassilieva et al. | 398/147 |
| 2009/0220228 A1 * | 9/2009 | Popovic | 398/48 |

FOREIGN PATENT DOCUMENTS

| | | |
|---|---|---|
| EP | 1 176 438 A1 | 1/2002 |
| WO | WO 03/052475 A1 | 6/2003 |
| WO | WO 2005/024481 A1 | 3/2005 |
| WO | WO 2005/064375 A1 | 7/2005 |

OTHER PUBLICATIONS

B. Little et al., "Microring Resonator Channel Dropping Filters", Journal of Lightwave Technology, vol. 15, No. 6, Jun. 1997.*

* cited by examiner

*Primary Examiner* — Shi K Li
(74) *Attorney, Agent, or Firm* — Don R. Mollick

(57) ABSTRACT

An optical device includes an optical splitter having an input port, a first output port, a second output port and a resonant structure including at least a resonator, the optical splitter being adapted to receive at the input port a WDM optical signal and to output at the first and second output ports, respectively, a first and a second portion of the optical signal, the second portion including the channels lying on a sub-grid of optical frequencies spaced by an integer multiple of the WDM frequency spacing; an optical combiner having a first input port, a second input port, an output port and adapted to receive at the first and second input ports, respectively, the first and the second portions and adapted to output them at said output port; a first optical path optically connecting the first output port of the optical splitter to the first input port of the optical combiner so as to propagate the first portion; a second optical path optically connecting the second output port of the optical splitter to the second input port of the optical combiner so as to propagate the second portion; and an optical filter optically coupled to the second optical path, wherein the optical combiner includes at least one resonant structure including at least a resonator.

30 Claims, 9 Drawing Sheets

METHOD AND DEVICE FOR TUNABLE OPTICAL FILTERING

CROSS REFERENCE TO RELATED APPLICATION

This application is a national phase application based on PCT/EP2005/014092, filed Dec. 28, 2005, the content of which is incorporated herein by reference.

FIELD OF THE INVENTION

The present invention relates to the field of optical communication systems including tunable optical filtering functionality, such as tunable optical add and/or drop functionality.

BACKGROUND OF THE INVENTION

A common technique to increase the transmission capacity of today optical communication systems is wavelength division multiplexing (WDM), wherein a plurality of optical channels, each having a respective optical frequency (and correspondingly respective optical wavelength), are multiplexed together in a single optical medium, such as for example an optical fiber. The optical frequencies allocated for the WDM channels are typically arranged in a grid having an equal spacing between two adjacent frequencies. In dense WDM (DWDM), wherein the WDM channels may be closely spaced, the frequency spacing is typically equal to about 100 GHz (corresponding wavelength spacing of about 0.8 nm) or about 50 GHz (about 0.4 nm). Other used channel separations are 200 GHz, 33.3 GHz and 25 GHz. Typically, the set of allocated optical frequencies occupies an optical bandwidth of about 4 THz, which gives room for the use of up to 40 or 41 WDM channels having 100 GHz spacing. The device of the present invention is suitable for a WDM optical bandwidth of at least about 2 THz, preferably at least about 3 THz, typically placed around 1550 nm.

Optical networking is expected to be widely used in perspective optical communication field. The term 'optical network' is commonly referred to an optical system including a plurality of point-to-point or point-to-multipoint (e.g., metro-ring) optical systems optically interconnected through nodes. In all-optical transparent networks few or no conversions of the optical signal into electrical signal, and then again in optical signal, occur along the whole path from a departure location to a destination location. This is accomplished by placing at the nodes of the optical networks electro-optical or optical devices which are apt to process the optical signal in the optical domain, with limited or no need for electrical conversion. Examples of such devices are optical add and/or drop multiplexers (OADM), branching units, optical routers, optical switches, optical regenerators (re-shapers and/or re-timers) and the like. Accordingly, the term 'optical filtering' or 'optical processing', for the purpose of the present description is used to indicate any optical transformation given to an optical radiation, such as extracting a channel or a power portion of said channel from a set of WDM channels ('dropping'), inserting a channel or a power portion of said channel into a WDM signal ('adding'), routing or switching a channel or its power portion on a dynamically selectable optical route, optical signal reshaping, retiming or a combination thereof. In addition, optical systems, and at a greater extent optical networks, make use of optical amplifiers in order to compensate the power losses due to fiber attenuation or to insertion losses of the optical devices along the path, avoiding the use of any conversion of the optical signal into the electrical domain even for long traveling distances and/or many optical devices along the path. In case of DWDM wavelengths, all channels are typically optically amplified together, e.g. within a bandwidth of about 32 nm around 1550 nm.

In optical systems, and at a greater extent in optical networks, a problem exists of filtering one or more optical channels at the nodes while minimizing the loss and/or the distortion of the filtered optical channel(s), as well the loss and/or the distortion of the optical channels transmitted through the node ideally without being processed (hereinafter referred to as 'thru' channels). Advantageously, the optical processing node should be able to simultaneously process more than one channel, each one arbitrarily selectable independently from the other processed channels. Ideally up to all the channels may be simultaneously selectable to be processed, but in practice a number between 2 and 16, preferably between 4 and 8, is considered to be sufficient for the purpose.

It is desirable that the optical processing node is tunable or reconfigurable, i.e., it can change dynamically the subset of channels on which it operates. In order to be suitable to arbitrarily select the channel to be processed within the whole WDM optical bandwidth, the tuning range of the whole optical processing node should be at least equal to said optical bandwidth. It is in general a problem to tune an optical filter over the whole optical bandwidth, especially when the bandwidth exceeds about 3 THz, for example when it is equal to about 4 THz. For example, notwithstanding the silicon's fairly large thermo-optic effect, scanning the entire telecommunication C-band (32 nm or 4 THz) with a single tunable silicon filter, such as a single silicon microring filter, remains quite a difficult task due to the high temperatures reached at the heater layer (up to about 600° C.).

It is also preferred that while the processing node "moves" from an initial channel (A) to a destination channel (B), the channels different from A and B remain unaffected by the tuning operation. In this case the component is defined as 'hitless'. In particular, the channels placed between the initially processed channel and the final channel after tuning should not be subject to an additional impairment penalty, called 'hit', by the tuning operation. The hit may include a loss penalty and/or an optical distortion such as phase distortion and/or chromatic dispersion.

For example, optical communication networks need provisions for partially altering the traffic at each node by adding and/or dropping one or several independent channels out of the total number. Typically, an OADM node removes from a WDM signal a subset of the transmitted channels (each corresponding to one frequency/wavelength), and adds the same subset with a new information content, said subset being dynamically selectable.

There are several additional concerns. The tunable optical processing node should not act as a narrow band filter for the unprocessed channels, since concatenation of such nodes would excessively narrow the channel pass bands. The tunable optical processing node should also be ultra-compact and should have low transmission loss and low cost, since these important factors ultimately determine which technology is selected.

U.S. Pat. No. 6,839,482 discloses (see, e.g., FIG. 2 thereof) an optical filter device for processing a multi-frequency light signal to separate therefrom a predetermined frequency component, the device comprising: (i) a first tunable filter structure having a first tuning range and operable to receive an input light signal and output first and second light components thereof through first and second spatially separated light paths, respectively, the first light component having a specific frequency range of the input signal including said predetermined frequency component, and the second light component including a remaining portion of the input light; and (ii) a second tunable filter structure having a second tuning range defining an optical spectrum overlapping with that of the first filter, the second filter being operable to receive the first light component and separate therefrom said predetermined frequency component to propagate to a drop/add light path of the device and direct a remaining portion of the first light component into the first filter structure to be output at the second light path.

SUMMARY OF THE INVENTION

The Applicant has discovered that in U.S. Pat. No. 6,839,482 the channel resonant with the first filter structure are distorted twice in the interaction with the first filter structure and the remaining non-resonant channels are negligibly distorted. The thru output is consequently strongly not equalized and the dispersion response of the filter is penalized.

The Applicant has also noted that the filter device described in the cited patent is not optimally designed for adding and/or dropping a plurality of independent optical channels. Considering, by way of example, the need of adding and/or dropping two independent channels from a WDM signal, in the cited patent it is suggested to cascade two times the whole structure (e.g. that of FIG. 2, bottom, thereof), thus giving rise to several disadvantages. The resulting structure would be complex, both in structure and in operation. Moreover, the cascade of two first tunable filter structures (e.g. ring-resonator pairs R1-R2 and R3-R4 of FIG. 2 of the cited patent) gives rise to a corresponding duplication of the attenuation and the chromatic dispersion introduced by the single first tunable filter structure on the thru channels. The above problems worsen with the increasing of the number of independent channels to be added and/or dropped.

The Applicant has found that there is a need for an optical communication system having tunable optical processing functionality which leaves unaltered, or at least reduces the alteration of, the thru channels during processing operation. Moreover, the optical processing node should preferably leave unaltered the thru channels during tuning, i.e. hitless. In particular, it is desired that the optical processing node introduces no or low chromatic dispersion to the thru channels. In addition, the optical processing node should preferably be low-loss, low-cost, fast tunable and/or broadband.

The Applicant has found a method and a system for optical transmission furnished of optical processing functionality which can solve one or more of the problems stated above. The solution of the present invention is simple, feasible and low cost. A particular architecture has been conceived which enables a full C-band (32 nm) tunability by effectively tuning the single drop filter only about half of it (18.4 nm). An advantage of the particular architecture is that both the optical splitter and the optical combiner do not need to be tuned while having the capability of filtering an arbitrary optical channel. A trimming heater may be fabricated on top of each device component to carefully align their frequencies to the ITU grid and to compensate for possible fabrication errors.

According to an aspect of the present invention, there is provided an optical device (200) comprising:

an optical splitter (210) having an input port (212), a first output port (214), a second output port (216) and a resonant structure (218) comprising at least a resonator, the optical splitter being adapted to receive at said input port an optical signal comprising a plurality of channels lying on a grid of optical frequencies equally spaced by a frequency spacing and occupying an optical bandwidth, and wherein said optical splitter is adapted to output at said first (214) and second (216) output port respectively a first and a second portion of said optical signal, said second portion substantially comprising the channels lying on a second sub-grid of optical frequencies spaced by an integer multiple of said frequency spacing and the first portion substantially comprising the remaining channels lying on a first sub-grid, wherein the resonant structure (218) is apt to resonate with the optical frequencies of the second portion so that, in operation, the second portion is output at the second output port by interaction with the resonant structure (218);

an optical combiner (220) having a first input port (212), a second input port (224), and an output port (226) and being adapted to receive at said first and second input port respectively the first and the second portion and to output them at said output port (226);

a first optical path (230) optically connecting the first output port (214) of the optical splitter (210) to the first input port (222) of the optical combiner (220) and apt to propagate said first portion;

a second optical path (240) optically connecting the second output port (216) of the optical splitter (210) to the second input port (224) of the optical combiner (220) and apt to propagate said second portion; and an optical filter (260) optically coupled to the second optical path (240) and apt to filter a channel within said second portion propagating through the second optical path (240), wherein the optical combiner (220) comprises at least one resonant structure (225, 227, 229) comprising at least a resonator and apt to resonate with the optical frequencies of the first portion so that, in operation, the first portion is output at said output port (226) by interaction with said at least one resonant structure (225, 227, 229).

Advantageous embodiments include an optical device, wherein the optical combiner (220) may comprise a plurality of resonant structures (225, 227, 229), wherein each resonant structure comprises at least a resonator and it is apt to resonate with the optical frequencies of a respective sub-portion of the first portion so that, in operation, the respective sub-portion is output at said output port (226) by interaction with the respective resonant structure (225, 227, 229), being each respective sub-portion different from the other sub-portions, wherein the optical splitter (210) may further comprise a first optical waveguide (211) optically connecting the input port (212) to the first output port (214) and a second optical waveguide (213) optically connected to the second output port (216) and wherein said resonant structure (218) may be optically coupled to the first and second optical waveguide and may be optically interposed between the first and the second optical waveguide so that, in operation, the second portion propagates through it while being directed from the first optical waveguide (211) to the second optical waveguide (213); and the optical combiner (220) may further comprise a respective first optical waveguide (221) optically connected to the first input port and a respective second optical waveguide (223) optically connecting the second input port (224) to the output port (226), and wherein the resonant structures (225, 227) may be optically coupled to the respective first (221) and second (223) optical waveguide in parallel configuration and each one of the resonant structures (225, 227) is optically interposed between the respective first and second optical waveguide so that, in operation, the respective sub-portion of the first portion propagates through it while being directed from the respective first optical waveguide (221) to the respective second optical waveguide (223), or wherein the number of said plurality of resonant structures (225, 227) of the optical combiner (220) may be equal to said integer multiple diminished by one unit and said integer multiple may be greater than two.

In other embodiments of the optical device of the present invention, said integer multiple may be equal to two; or each sub-portion of the first portion may substantially comprise the channels lying on a sub-grid of optical frequencies spaced by said integer multiple of said frequency spacing; or each one of the resonant structures (225, 227) may comprise a respective tuning device; or the resonant structures (225, 227) may share a common tuning device; or the free spectral range of said optical filter (260) may be substantially equal to a further integer multiple of said frequency spacing, said further integer multiple not having common dividers with said integer multiple; or said optical filter (260) may be an add and/or drop filter comprising a respective optical port adapted to drop or add an optical channel comprised within the second portion, wherein said optical filter (260) may comprise at least a resonator (255) optically coupled to, and interposed between, the second optical path (240) and a drop waveguide (267) so as to be apt to drop said optical channel within the second portion from the second optical path toward said drop waveguide; or said optical bandwidth may be greater than or equal to about 2 THz; or said optical filter (260) may comprise micro-ring or racetrack resonators.

In a further aspect of the present invention, there is provided an optical communication system comprising a transmitter, a receiver, an optical line optically connecting the transmitter and the receiver and an optical device, as defined above, wherein the optical device is coupled to the optical line.

In a still further aspect of the present invention, there is provided a method for filtering a WDM optical signal, which includes a method for filtering an optical signal comprising a plurality of channels lying on a grid of optical frequencies equally spaced by a given frequency spacing and occupying an optical bandwidth, comprising:

a) splitting said optical signal by way of an optical splitter (210) having an input port (212), a first output port (214), a second output port (216) and a resonant structure (218) comprising at least a resonator, wherein said optical signal is input at said input port (212) and a first portion of the optical signal is output at said first output port (214) and a second portion of said optical signal is output at the second output port (216), said second portion substantially comprising the channels lying on a second sub-grid of optical frequencies spaced by an integer multiple of said frequency spacing and overlapping the resonances of said resonant structure (218) and the first portion substantially comprising the remaining channels lying on a first sub-grid;

b) filtering a channel belonging to the first or second portion; and c) after filtering, recombining said first portion and second portion by way of an optical combiner (220) having a first input port (222), a second input port (224), a respective output port (226) and at least one resonant structure (225) comprising at least a resonator, wherein the first portion is input at said first input port (222), the second portion is input at said second input port (224) and both the first and the second portions are output at said respective output port (226), the channels of the first portion having the optical frequencies overlapping the resonances of said at least one respective resonant structure (225) of the optical combiner (220).

In preferred embodiments of the method of the present invention:

said optical splitter (210) further comprises a first optical waveguide (211) optically connecting the input port (212) to the first output port (214) and a second optical waveguide (213) optically connected to the second output port (216) and wherein the resonant structure (218) is optically coupled to the first and second optical waveguide and optically interposed between the first and the second optical waveguides so that the second portion is output at the second output port (216) after crossing the resonant structure (218); and said optical combiner (220) further comprises a respective first optical waveguide (221) optically connected to the first input port (226) and a respective second optical waveguide (223) optically connecting the second input port (224) to the respective output port (226) and wherein the at least one respective resonant structure (225) is optically coupled to the respective first and second optical waveguide and optically interposed between the respective first and second optical waveguide so that the first portion is output at said respective output port (226) after crossing the at least one respective resonant structure (225);

wherein the resonant structure (218) of the optical splitter (210) may comprise a plurality of series-coupled resonators; or wherein said at least one resonator of the resonant structure of the optical splitter (210) and/or of the optical combiner (220) may be a micro-ring or racetrack resonator; or wherein the optical combiner (220) may have the same type and number of resonators of the optical splitter (210); or wherein the step of filtering may be performed on the second portion by way of an optical filter (260) adapted to act solely on the second portion and configured so that one of its resonances overlaps the optical frequency of said filtered channel, one of the two adjacent resonances overlaps an optical frequency of the first sub-grid and the other adjacent resonance lies outside said optical bandwidth, wherein the distance between said one resonance of said optical filter (260) and each one of said two adjacent resonances may exceed the half of the optical bandwidth, wherein the distance between said one resonance of said optical filter (260) and each one of said two adjacent resonances may exceed the half of the optical bandwidth by more than said frequency spacing, or wherein the optical filter (260) may comprise at least a resonator (255) optically coupled to, and interposed between, an optical path (240) and a drop waveguide (267) so that the step of filtering may comprise dropping said channel within the second portion from said optical path (240) toward said drop waveguide.

In still other preferred embodiments of the method of the present invention:

said integer multiple may be equal to two, and may further comprise at least one of the two following steps:

making the first portion bypass a further optical filter (250) adapted to act solely on the first portion; and configuring said further optical filter (250) so that one of its resonances overlaps an optical frequency of the second sub-grid near the center of said optical bandwidth and the two respective adjacent resonances both lie outside said optical bandwidth, wherein the further optical filter (250) may comprise at least a respective resonator optically coupled to, and interposed between, a further optical path (230) and a respective drop waveguide (257) so as to be apt to drop an optical channel within the first portion from the further optical path (230) toward said respective drop waveguide (257), wherein the drop waveguide (257) of the further optical filter (250) and the drop waveguide (267) of the optical filter (260) may be the same waveguide so that the further optical filter (250) and the optical filter (260) share the same drop waveguide (257, 267), or wherein the further optical filter (250) may have the same structure of the optical filter (260).

In still other preferred embodiments of the present invention:

said optical bandwidth may be greater than or equal to about 1 THz, or step c) of filtering the channel may comprise dropping said channel.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
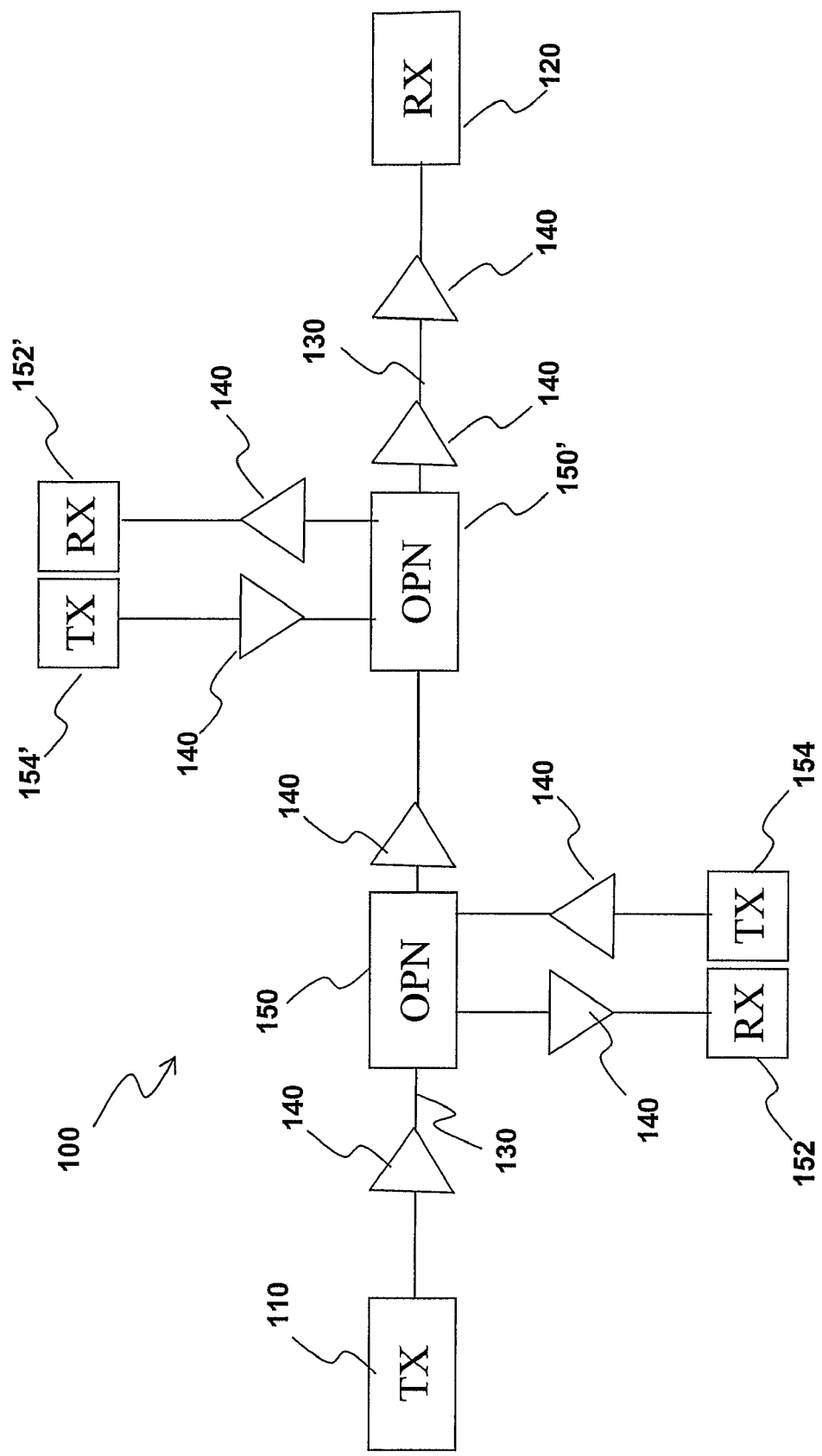
FIG. 1 schematically shows in terms of functional blocks an exemplary optical communication system architecture according to the present invention.

FIG. 1 shows an optical communication system architecture according to a possible embodiment of the present invention.

The optical communication system 100 comprises at least a transmitter 110, a receiver 120 and an optical line 130 which optically connects the transmitter and the receiver. The transmitter 110 is an opto-electronic device apt to emit an optical signal carrying information. It typically comprises at least an optical source (e.g., a laser) apt to emit an optical radiation and at least a modulator apt to encode information onto the optical radiation. Preferably, the transmitter 110 is a WDM transmitter (e.g., a DWDM transmitter) and the optical signal may comprise a plurality of optical channels (each carrying modulation-encoded information) having respective optical frequencies equally spaced by a given frequency spacing and occupying an optical bandwidth. Preferably, said optical bandwidth is at least 2 THz (in the near-infrared wavelength range, e.g. from 900 nm to 1700 nm), more preferably it is at least 3 THz, still more preferably it is equal to about 4 THz. The receiver 120 is a corresponding opto-electronic device apt to receive the optical signal emitted by the transmitter and to decode the carried information. The optical line 130 may be formed by a plurality of sections of optical transmission media, such as for example optical fiber sections, preferably cabled. Between two adjacent sections of optical fiber, an optical or opto-electronic device is typically placed, such as for example a fiber splice or a connector, a jumper, a planar lightguide circuit, a variable optical attenuator or the like.

For adding flexibility to the system 100 and improving system functionality, one or a plurality of optical, electronic or opto-electronic devices may be placed along the line 130. In FIG. 1 a plurality of optical amplifiers 140 are exemplarily shown, which may be line-amplifiers, optical boosters or pre-amplifiers.

According to the present invention, the optical system 100 comprises at least one optical processing node (OPN) 150 optically coupled to the optical line 130 and apt to filter or route or add or drop or regenerate, fully or partially, at least one optical channel of the WDM optical signal propagating through the optical line 130. The OPNs are preferably dynamically tunable or reconfigurable. In the particular case wherein the optical processing node 150 is an optical add/drop node 150, as shown in FIG. 1, i.e., a node adapted to route or switch or add and/or drop, the routed or switched or dropped or added channel(s) may be received or transmitted by further receiver(s) 152 or transmitter(s) 154, respectively, which may be co-located with the OPN node or at a distance thereof. The optical system or network 100 may advantageously comprise a plurality of optical processing nodes. In FIG. 1 a further optical processing node 150' is exemplarily shown, together with its respective optional transmitting and receiving devices 152' and 154'.

An optical system 100 having optical add/drop nodes 150, as shown in FIG. 1, is commonly referred to as an optical network and it is characterized by having a plurality of possible optical paths for the optical signals propagating through it. As exemplarily shown in FIG. 1, a number of six optical paths are in principle possible, which corresponds to all possible choices of the transmitter-receiver pairs in FIG. 1 (excluding the pairs belonging to the same node).

According to the present invention, the tunable optical processing node 150 is suitable for independently filtering one or more optical channels while limiting the distortion of the thru channels, being based on a scheme in accordance with the following.

Figure 2:
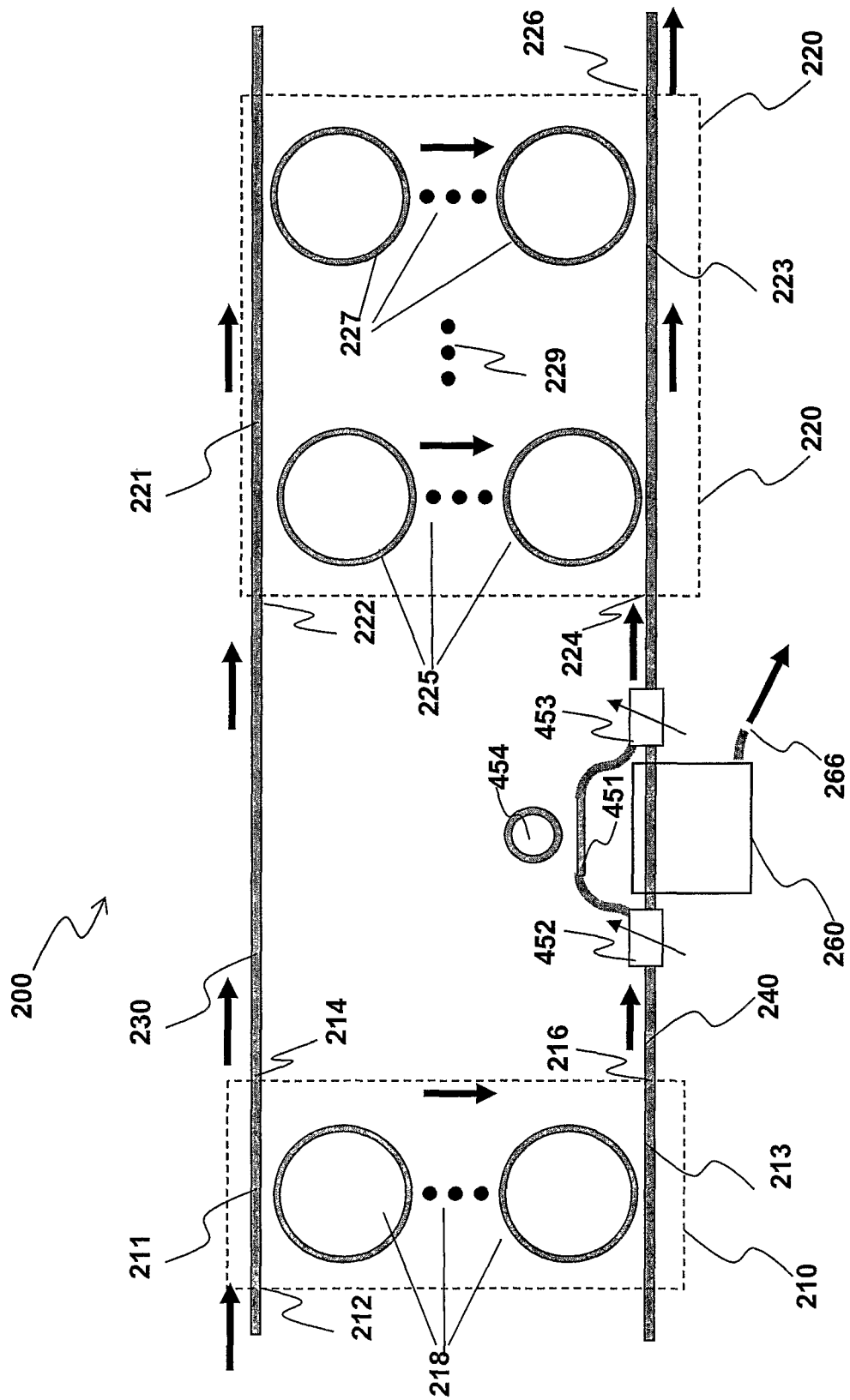
FIG. 2 is a schematic diagram showing in terms of functional blocks a scheme for optical filtering according to the present invention.

FIG. 2 shows a schematic diagram of an optical device 200 in accordance with an embodiment of the present invention.

The general design scheme of the present invention comprises an optical splitter 210 with an input port 212 and a first 214 and a second 216 output port and an optical combiner 220 having a first 222 and a second 224 input port and an output port 226. Throughout the present description, the terms 'input' and 'output' are used with reference to a conventional direction of propagation of the optical radiation (in FIG. 2 exemplarily from left to right and from top to bottom, as indicated by the thick arrows), but, when in operation, the optical radiation may propagate in the opposite direction.

A first optical path 230 and a second optical path 240 optically connect in parallel configuration the optical splitter 210 to the optical combiner 220. The first optical path 230 connects the first output port of the optical splitter 210 to first input port of the optical combiner 220. The second optical path 240 connects the second output port of the optical splitter 210 to the second input port of the optical combiner 220. The two optical paths 230 and 240 are preferably optically separated unless in correspondence of the optical splitter and combiner 210 and 220.

The optical splitter 210 is a resonant device, i.e. it comprises a resonant structure 218 which in turn comprises one or a plurality of resonators (or resonant cavities) 218. (In the drawings, the symbol consisting of three aligned points represent any arbitrary number of elements of the type adjacent to the symbol). For example, the resonator(s) may be linear cavities (i.e. cavities each having a plurality of reflectors), microring resonators, racetrack resonators, photonic band gap cavities, Bragg gratings or the like. A single resonant optical cavity has associated 'resonant wavelengths' (and corresponding 'resonant frequencies'), defined as those wavelengths which fit an integer number of times on the cavity length of the resonant optical cavity. For example a Bragg grating comprises a plurality of coupled resonant cavities. Strong frequency dependence of the phase/dispersion transfer function typically occurs in correspondence of the resonant frequency(ies). The distance between two adjacent resonant frequencies is referred to as the free spectral range (FSR) of the individual resonator.

The optical splitter 210 has an optical power response at the second output port 216, when a broad spectrum optical radiation is inputted in its input port 212, periodically peaked with respect to the optical frequency, at least in an optical bandwidth of interest (e.g. 4 THz around 1550 m or 193 THz). The distance between two successive peaks within the optical power response function at the second output port 216 is referred to as 'free spectral range' or FSR of the optical splitter 210 and will be generally expressed in optical frequency units. The optical frequencies corresponding to the peaks of the optical power response function at the second output port 216 are referred to as the 'resonances' of the optical splitter 210 and they may, typically, corresponds to the resonances of one or more of the individual resonators.

The optical power response of the other output port 214 is typically the complementary function (1-f) of the optical power response above, neglecting the loss introduced by the optical splitter itself.

According to the present invention, the optical splitter 210 has a free spectral range corresponding to about an integer multiple of the frequency spacing $\Delta f$ of the allocated WDM frequencies (FSR=m$\Delta f \pm 40\%$ $\Delta f$). The term integer multiple means an integer greater than or equal to two. Said integer multiple is preferably smaller than 10, more preferably it is comprised between, and including, 2 and 7. For example, given a frequency spacing of about 100 GHZ, the FSR is selected to be equal to about 200 GHz or 300 GHz.

The 'cross-talk' of the optical splitter 210 is a known optical parameter defined, at an output port, as the optical power level of an optical channel adjacent to a given optical channel corresponding to a peak of the optical power response at that output port, expressed in term of relative optical power with respect to the power of the given optical channel. The cross-talk of the optical splitter 210 of the present invention is preferably low, e.g. it may be less than about −10 dB, preferably less than about −15 dB, more preferably less than about −25 dB.

In other words, according to the present invention the optical splitter 210 is apt to receive at its input port 212 a WDM optical signal having a plurality of optical channels allocated on a WDM grid of n optical frequencies equally spaced by a given frequency spacing $\Delta f$ and occupying an optical bandwidth BW=(n−1)$\Delta f$, and to output at said first 214 and second 216 output port respectively a first and a second portion of said optical signal. The second portion substantially comprises all the channels, within said plurality of channels, which are allocated on a sub-grid (of the WDM grid) of optical frequencies equally spaced by an integer multiple of said frequency spacing (m$\Delta f$) and the first portion substantially comprises the remaining channels. Here the term 'substantially' is used to take into account the (typically inevitable) cross-talk described above. The optical splitter 210 is preferably further selected so as to introduce low loss and/or low distortion (e.g. dispersion) to the split output channels. Assuming the n frequencies of the WDM grid being numbered with an index i from 1 to n, than the second portion of optical channels substantially comprises all the channels having frequencies selected one every m frequencies of the WDM grid. In the special case of m=2, the second portion of optical channels substantially comprises all the channels having frequencies with a given parity of the index i (e.g. the 'odd' channels), and the first portion of optical channels substantially comprises the remaining channels having the opposite parity (e.g. the 'even' channels).

Figure 3:
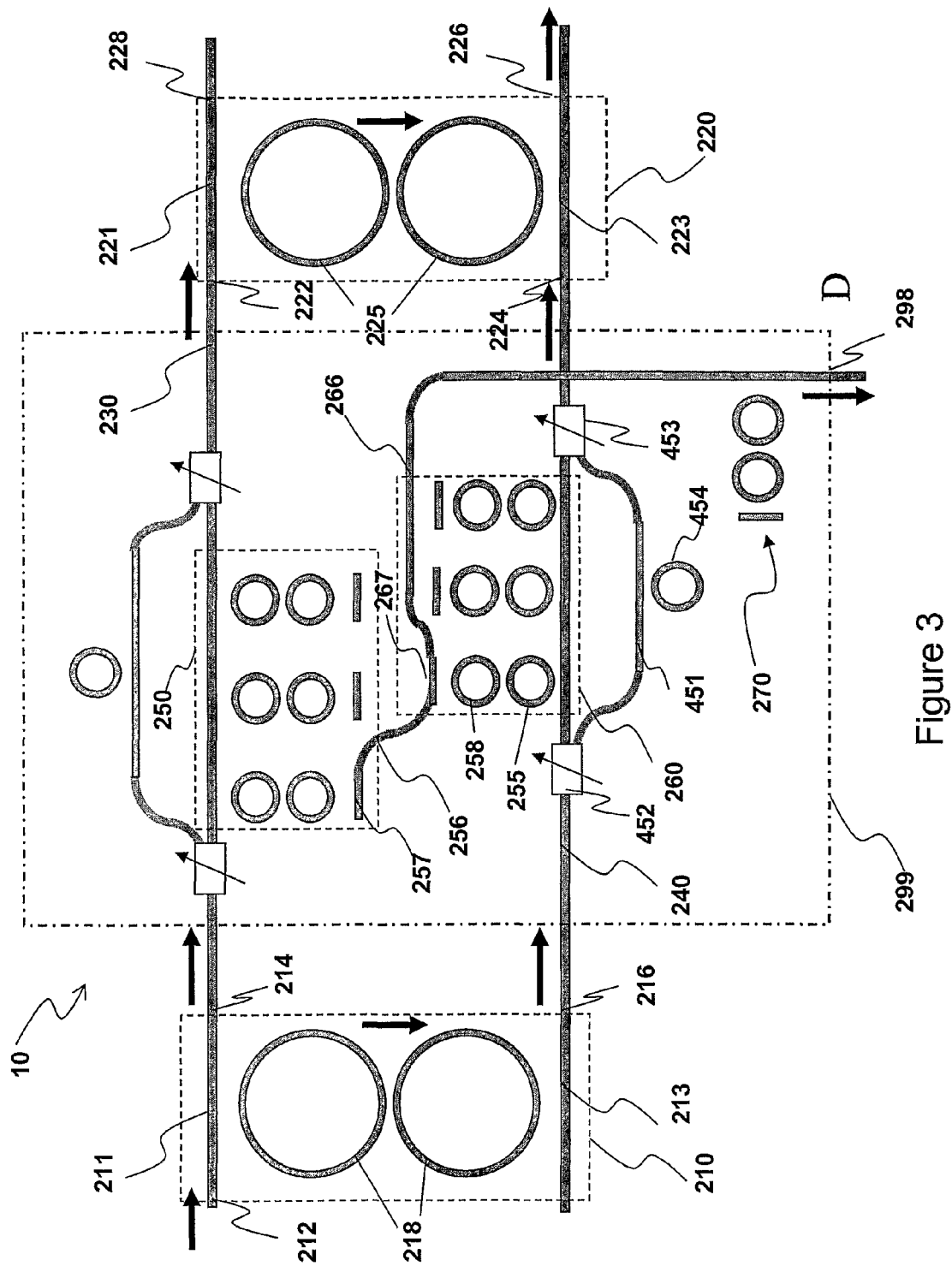
FIG. 3 shows in terms of functional blocks an exemplary configuration of a device for tunable optical add and/or drop multiplexing according to the present invention.

In a configuration, as shown in FIG. 2, the optical splitter 210 may comprise a first optical waveguide 211 optically connecting the input port 212 to the first output port 214 and a second optical waveguide 213 optically connected to the second output port 216. The resonant structure 218 may be optically coupled to the first and second optical waveguide and optically interposed, with respect to the direction of propagation of the second portion, between the first and the second optical waveguide. In case of a resonant structure 218 comprising a plurality of resonators, they may be coupled in parallel between the two optical waveguides 211 and 213 or, preferably, in series as shown in FIG. 2. Preferably the coupled resonators are less than four, more preferably they are two or three. In case of two microring resonators 218, as shown in FIG. 3, they typically have the same ring radius so that the free spectral range of the individual resonators are all equal and they are also equal to the FSR, as defined above, of the whole optical splitter 210.

When the resonant splitter 210 is in operation, the optical channels input into the input port 212 which are output into the second output port 216 coupled to the second optical path 240 (i.e. those channels belonging to the second portion) are those channels having optical frequencies which match the resonances of the resonating structure 218 and they physically travel across the resonators 218, as indicated by the down-arrow near microrings 218.

Preferably, a tuning device (not shown) is coupled to the optical splitter 210 in order to control the working point (i.e. the position of the resonances) of the optical splitter, such as for example in order to properly match the peaks of the respective power response with the grid of the WDM frequencies and/or to compensate for possible fabrication errors. Such working point may be controlled at a fixed position ('trimming') or it may be dynamically changed ('tuning'), typically within a tuning range equal to the FSR of the splitting device, depending on the operative conditions.

The optical combiner 220 is a combining device apt to receive in its two input ports 222 and 224 respectively two optical radiations (related respectively to the first and second portion) propagating along the first and second optical path 230 and 240 and to combine them together so as to output the combined radiation into the output port 226, possibly with minimum loss and/or distortion.

The optical combiner 220 comprises one or a plurality of resonant structures 225, 227, 229 each resonant structure comprising at least a resonator. According to the present invention, the one or more resonant structures of the optical combiner 220 are apt, as a whole, to resonate with the optical frequencies of the first portion so that, in operation, the first portion is output at said output port 226 by interaction with said at least one resonant structure 225, 227. On the other hand, the at least one resonant structure 225, 227, 229 when configured to resonate with the optical frequencies of the first portion, do not resonate with the optical frequencies of the second portion, so that the latter does not interact (or negligibly interact) with the at least one resonant structure of the combiner 220.

In one configuration, as shown in FIG. 2, the optical combiner 220 comprises a plurality of resonant structures 225, 227, 229, wherein each resonant structure comprises at least a resonator and it is apt to resonate with the optical frequencies of a respective sub-portion of the first portion so that, in operation, the respective sub-portion is output at said output port 226 by interaction with the respective resonant structure 225, 227, 229, being each respective sub-portion different from the other sub-portions. Preferably, the FSR of the resonant structures are all substantially equal and further equal to the FSR of the splitter 210. Advantageously, the number of the plurality of resonant structures 225, 227, 229 is equal to the integer multiple m diminished by one unit, so that the corresponding (m−1) sub-portions constitute the first portion. Preferably, in operation, the grid of resonances of each resonant structure 225, 227, 229, is maintained detuned by a quantity equal to a suitable multiple of the frequency spacing with respect to the grid of resonances of the other resonant structures. Preferably, the resonant structures have all the same structure, i.e. the same type and number of resonators. Preferably, each of the resonant structures 225, 227, 229 of the optical combiner 220 has the same structure of the resonant structure 218 of the optical splitter 210. For example, given an FSR of the splitter 210 equal to 400 GHz (m=4), than three (m−1) resonant structures 225, 227 may be used having FSR=400 GHz and having a detuning of the respective grid of resonances equal to, respectively, 100, 200 and 300 GHz with respect to the grid of resonances of the splitter 210.

The optical combiner 220 may have a first optical waveguide 221 optically connected to the first input port 222 and a second optical waveguide 223 optically connecting the second input port 224 to the output port 226. In this case, the one or more resonant structures 225, 227 may be optically coupled to the first and second optical waveguide 221, 223, as shown in FIG. 2, and each resonant structure is optically interposed between the first and second optical waveguide 221, 223 so that the respective sub-portion is directed from the first optical waveguide 221 to the second optical waveguide 223 by physically propagating across the respective resonant structure 225, 227, 229. In case of a plurality of resonant structures 225, 227, 229, the above layout is said 'in parallel configuration'.

The working point (i.e. the position of the resonances) of the resonant structures 225, 227, 229 may need to be controlled, either at a fixed position ('trimming'), for example in order to properly match the resonances with the grid of the WDM frequencies and/or to compensate for possible fabrication errors, or dynamically changed ('tuning'), typically within a tuning range equal to the FSR of the splitting device 210, depending on the operative conditions.

In an embodiment, a single tuning device (not shown) is coupled to the optical combiner 220 in order to control the working point of all the resonant structures 225, 227, 229 at a time. In this case, the resonant structures may be manufactured in such a way that at a given operative condition (e.g. a given temperature) the respective resonances of the resonant structures are properly shifted with respect to the resonances of all the other resonant structures by a quantity equal to the frequency spacing. This can be achieved in practice by suitably trimming the structure of the optical waveguide constituting the microring resonators (e.g. by e-beam dose trimming during lithography or UV-curing of a suitable cladding).

In another embodiment, a tuning device (not shown) is coupled to each of the resonant structures 225, 227 in order to control the respective position of the resonances.

As shown in FIG. 2, according to the present invention an optical filter 260 is optically coupled to the second optical path 240 and it is adapted to receive at least a portion of the optical radiation propagating through the second optical path 240 via an input port and to output a transformed optical radiation via an output port according to optical transfer functions (such as phase and power transfer functions). The optical filter 260 may be any optical device having its optical transfer functions wavelength-dependent in the wavelength band of interest. For example, it may be apt to filter an optical channel within said second portion propagating through the second optical path 240.

The optical filter 260 may be a resonant optical filter, i.e. it comprises one or more resonant cavities (or resonators), such as Bragg gratings or microcavities such as linear cavities, microrings, racetracks, photonic band gap cavities and the like. In a preferred configuration, the resonant optical filter 260 comprises microring or racetrack resonators. The transfer functions (e.g. phase, dispersion or power) of such a resonant optical filter 260 are typically characterized by strong wavelength dependence at and in the proximity of a resonant wavelength of one or more of its resonators. The perturbations of the power transfer function (hereinafter called resonances of the optical filter) are typically equally spaced in frequency and, in analogy with the definition given for the splitter 210, the distance between two adjacent resonances of an optical filter is referred to as the 'free spectral range' of the resonant optical filter. In case all the resonators comprised within the optical filter have the same FSR, typically the FSR of the optical filter coincides with the FSR of the single resonators.

In a preferred configuration, the optical filter 260 is a tunable optical filter, i.e. it is apt to select an arbitrary optical channel to be filtered.

In a preferred embodiment the optical filter 260 is an optical add and/or drop filter (OADF) having at least a further optical port 266 ('drop port') having the function of dropping or adding, fully or partially, at least an optical channel within the optical band of interest propagating in the optical path 240. In other words, the power transfer function at the drop port 266 is typically characterized by high transmission peaks equally spaced in frequency by a quantity equal to the FSR of the optical filter. In a preferred embodiment, the OADF 260 has a still further optical port ('add port', not shown) which in combination with the further optical port 266 forms a pair of add and drop ports.

In a preferred configuration, the optical filter 260 has an associated bypass path 451 suitable to guarantee a hitless tuning of the optical filter itself. A first and a second optical switch 452 and 453 may optionally be optically coupled to the second optical path 240 and to the bypass path 451, as shown in FIG. 2.

The optical switch 452 is configured to assume alternatively a first and a second state, wherein an optical radiation propagating along the optical path 240 is directed, in the first state, substantially solely to the second optical path 240 and, in the second state, substantially solely to the bypass path. Preferably, the optical switch 452 switches from the first to the second state continuously, i.e. the splitting ratio of the output power of the two output ports switches from 0:100 to 100:0 and vice versa continuously. The second optical switch 453 has the same optical behavior of the first optical switch 452, provided that the second switch 453 is a "time-reversal copy" of the first optical switch 452, i.e. it operates in reverse with respect to the first switch. In one advantageous configuration, the second optical switch 453 is a structurally identical copy of the first optical switch 452 operating in reverse, i.e. the second optical switch 453 is a mirror symmetric copy of the first optical switch with respect to a vertical axis in the plane of FIG. 2. The first and the second optical switch 452 and 453 are configured to be operated in synchronous so as to maintain at any time during operation a symmetrical reciprocal configuration. The two optical switches 452, 453 may be actuated by any actuation technique (such as thermo-optic, MEMS actuated, electro-optic, acusto-optic, elasto-optic, stress, etc) so as to switch from the first to the second state and vice versa.

The first and second optical switch 452, 453 may be any arbitrary device that meet the above requirements, including variable couplers (such as planar waveguide couplers), variable Y branches, Δβ switches, alternating Δβ switches, Mach-Zehnder interferometer (MZI) based switches or the like. The first and second optical switch 452, 453 are preferably wavelength-independent over the allocated WDM bandwidth. For example, they may be identical MZI-based optical switches, each one comprising a balanced MZI having a pair of identical 3-dB optical couplers and a controllable phase shifter (for example thermally actuated) along one of the two arms.

Optionally, an all-pass filter 454 is optically coupled to the bypass path 451 and it is adapted to introduce a narrowband wavelength dependent phase change to the optical radiation propagating therethrough so as to match the phase distortion introduced by the tunable optical filter 260 at least at a channel neighboring the channel on which the optical filter 260 is tuned. The all-pass filter 454 comprises a resonant optical cavity. Strong wavelength dependence of the phase transfer function typically occurs in correspondence of the resonant wavelength(s). The all-pass filter has, in the wavelength band of interest, a wavelength independent power transfer function and a phase transfer function having a wavelength/frequency dependence which exhibits typical resonance induced behavior. Advantageously, the resonant all-pass filter 454 is apt to be tuned so that at least one of its resonant wavelengths overlaps to a resonant wavelength of the tunable optical filter 260 on the opposite path 240. Advantageously, the all-pass filter 454 is adapted to have a FSR selectable to be equal to the FSR of the tunable optical filter 260 so as to facilitate fabrication and phase matching. The resonant all-pass filter 454 is adapted to apply the correct phase distortion on channels adjacent to the filtered one while leaving substantially unaffected the signal amplitude.

In a preferred configuration, the all-pass filter 454 comprises a single resonator with a power coupling coefficient between the latter and the bypass path 451 advantageously selected to be equal to the sum of the power coupling coefficients of the stages (see below) of the filter 260 cascaded along the path 240. A single resonator all-pass filter 454 with the above characteristics helps minimizing the chromatic dispersion introduced by the all-pass filter.

An advantage of the combination of the optical splitter 210 above and the optical filter 260 is that the requirements of the optical filter in terms of roll-off are relaxed because the optical filters receive portions of the WDM signal having a coarser grid (e.g. 200 GHz or 300 GHz instead of 100 GHz). This allows for example the use of a drop filter having two-ring stages, as described below, instead of filters having three- or four-ring stages, which exhibit much more fabrication and operation challenges.

In the following, a method for optical filtering according to an embodiment of the present invention will be described. This method may be implemented by operation of the scheme of the optical device 200 of FIG. 2, described above. Where useful for the understanding of the method of the present invention, reference will be made to elements and corresponding reference numerals of FIG. 2, without restricting the scope of the method. The method is particularly suitable to filter at least an optical channel within a plurality of WDM channels, while leaving the thru channels with a minimum alteration or no alteration at all.

First, a WDM optical signal comprising a plurality of optical channels having respective optical frequencies lying on a grid ('WDM grid') of allocated frequencies equally spaced by a given frequency spacing, said grid occupying an optical bandwidth BW, is split by way of the optical splitter 210, into a first and a second portion spatially separated. It is noted that the WDM optical signal does not necessarily need to comprise all the channels which may occupy said grid until it is filled. Actually, one or more of the allocated frequencies of the grid may be vacant. Nevertheless, the method and device of the present invention is suitable for processing a full-grid WDM signal and the examples in the present description will refer to this case, without limiting the scope of the invention.

Figure 4:
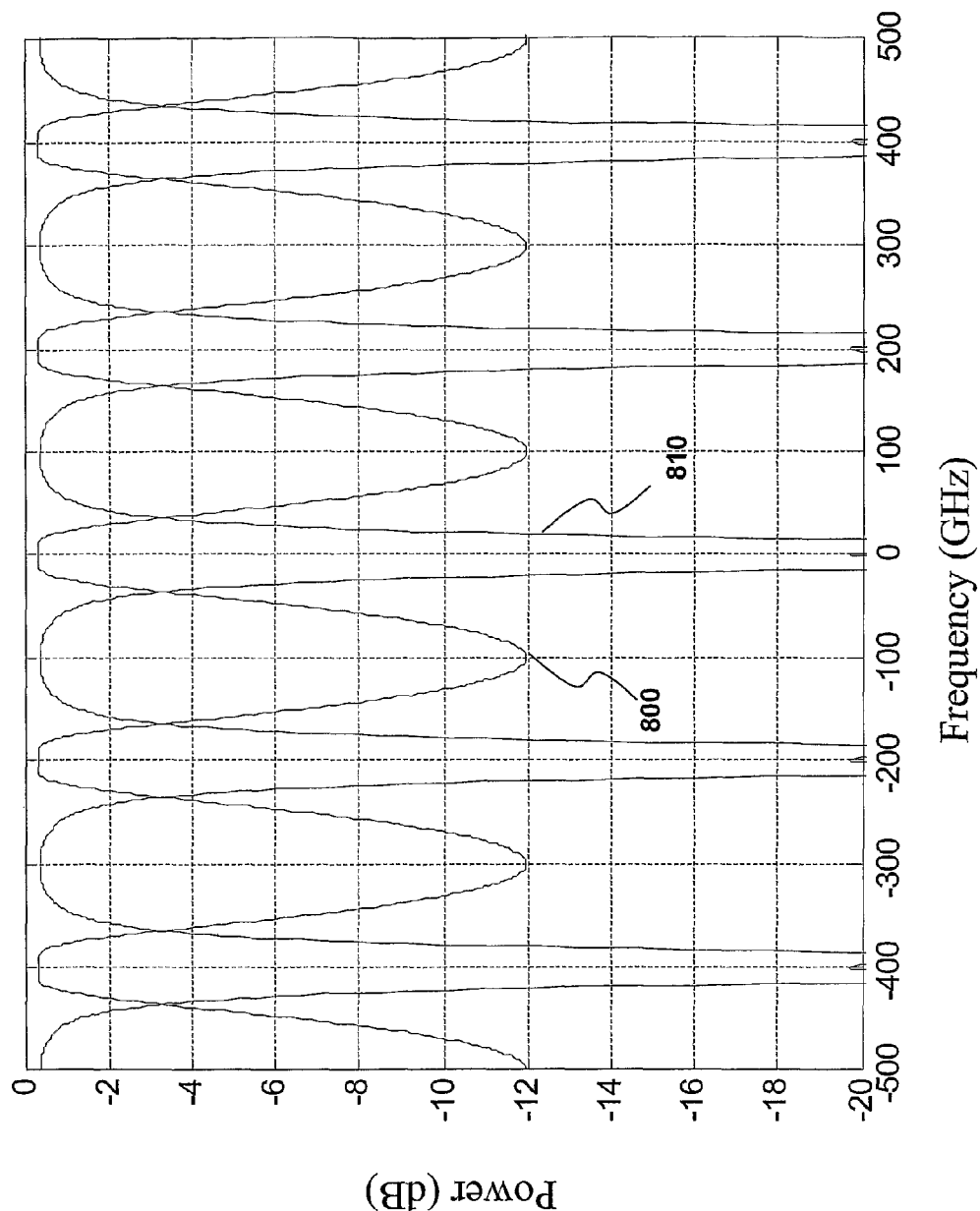
FIGS. 4 and 5 respectively show the calculated amplitude and dispersion response of the optical splitter comprised in the filtering device of FIG. 3.

The second portion of the optical signal comprises a sub-group of said optical channels having optical frequencies lying on a second sub-grid of the WDM grid having frequencies spaced by an integer multiple of said frequency spacing and the first portion comprises the remaining optical channels lying on a respective first sub-grid of frequencies. The first and second frequency sub-grids, respectively associated to the first and second portion, are complementary sub-grids of the grid of allocated WDM frequencies described above. Exemplarily, for m=3 the first portion may comprise the channels selected one on three channels and the second portion the remaining two channels on three. In each portion, the residual optical power of the channels substantially belonging to the other portion with respect to the optical power of the first portion channels ('cross-talk') is below −10 dB. Preferably, the cross-talk is below −15 dB, more preferably below −20 dB. In the second portion, the cross-talk of the channels substantially belonging to the first portion may be worse than the cross-talk in the first portion (as shown in FIG. 4).

A channel belonging to the second portion is filtered by way of an optical filter 260, adapted to act solely on the second portion, and configured so that one of its resonances overlaps the optical frequency of said filtered channel. Preferably, one of the two adjacent resonances overlaps an optical frequency of the first sub-grid and the other adjacent resonance lies outside said optical bandwidth. In a configuration, both the two adjacent resonances overlaps an optical frequency of the first sub-grid.

In case a by-pass path 454, together with switches 452 and 453 is present, the filtering of the channel is accomplished by acting on the optical switches 452 and 453 so as to maintain substantially all the optical radiation output from the output port 216 of the optical splitter 210 on the second optical path 240, so as to interact with the optical filter 260.

The first portion propagates along the first optical path 230.

The first and second portions of optical channels are then recombined by way of the combiner 220, which is properly tuned or trimmed so as to resonate, as a whole, with the optical frequencies of the first sub-grid and not to resonate with those of the second sub-grid, as previously described.

With reference now to FIG. 3, a further realization of a tunable optical device 10 in accordance with the present invention will be described. Where appropriate, the same reference numerals of FIG. 2 for like elements have been used and, for these elements, reference is made to the description above.

In the configuration shown in FIG. 3, the optical splitter 210 has a FSR equal to the double of the frequency spacing and the optical combiner 220 has the same structure of the optical splitter 210. In the present description, the expression 'having the same structure' means having the same type and number of resonators, as well as the same layout of the resonators.

In FIG. 4, there are shown the calculated optical power response curves for the first output port 214 (curve 800) and the second output port 216 (curve 810) of an exemplary optical splitter 210 as shown in FIG. 3, which comprises two series-coupled microring resonators. Here the zero frequency conventionally corresponds to a frequency of a channel belonging to the second portion, i.e. a channel substantially output at the second output port 216. A rigorous transfer matrix approach and a 3D Finite Difference Time Domain approach have been respectively used for the calculation of the transfer functions and of the actual dimensional layout of the optical components of the present description. Throughout the present description, the TE polarization mode has been investigated, without restricting the scope of the present invention.

Silicon has been selected as core material of the waveguides constituting both the resonators 218 and the optical waveguides 211, 213. The choice of silicon is due to its high thermo-optic effect which enables a high degree of tunability. Silica may be used as a cladding material surrounding the silicon waveguide core, e.g. in a buried waveguide. Alternatively other kind of materials could be used as cladding such as: polymers, spin on glass i.e. HSQ, Si3N4, etc. The high index contrast waveguide obtained by the above material systems allows fabricating microring resonators with very small radius and negligible bending losses. Si waveguides height may suitably be in the range of 100-300 nm and its thickness in the range of 200-600 nm. In the example relevant to FIG. 4, silicon waveguide cross section is about 500 nm width and 220 nm height. A Sio2 top cladding with a refractive index of $n_{clad}$=1.446 has been included in the design. Silicon refractive index has been taken equal to 3.476.

In calculating the optical responses, it has been assumed a realistic value for the total loss of the substantially straight (i.e. negligible bending radiation losses) silicon waveguides (e.g. 211, 213) and of the microring waveguide 218 of respectively 3 dB/cm and 10 dB/cm. The present invention equally applies in case of different values of losses. The calculated effective and group indexes of the Si waveguide were respectively in the range of about 2.43-2.48 and 4.21-4.26. The ring radius of the resonators 218 is 55(±1%) μm which corresponds to an FSR of about 200 GHz. The ring to bus and ring to ring power coupling coefficients are respectively 74% (±5%) and 44% (±5%), which may be exemplarily obtained by a ring to bus gap equal to 120 nm and a ring to ring gap equal to 140 nm.

It is noted that the cross-talk at the second output port is better (smaller) than the cross-talk at the first one. The in-band ripple is less than about 0.2 dB and the insertion loss less than about 1 dB.

The optical components described in the present description, such as the optical splitter/combiner 210/220 and the optical filter 250 or 260 of FIG. 3, may be fabricated by any fabrication process known in the field of integrated optics, such as a layering process on a substrate, e.g. an SOI wafer having a thickness of the buried oxide in the range of 3-10 microns and a thickness of the top Si in the range of 50-1000 μm. The layering process may include the e-beam lithography and etching steps. A SiO$_2$ layer could be deposited as a top cladding.

Figure 5:
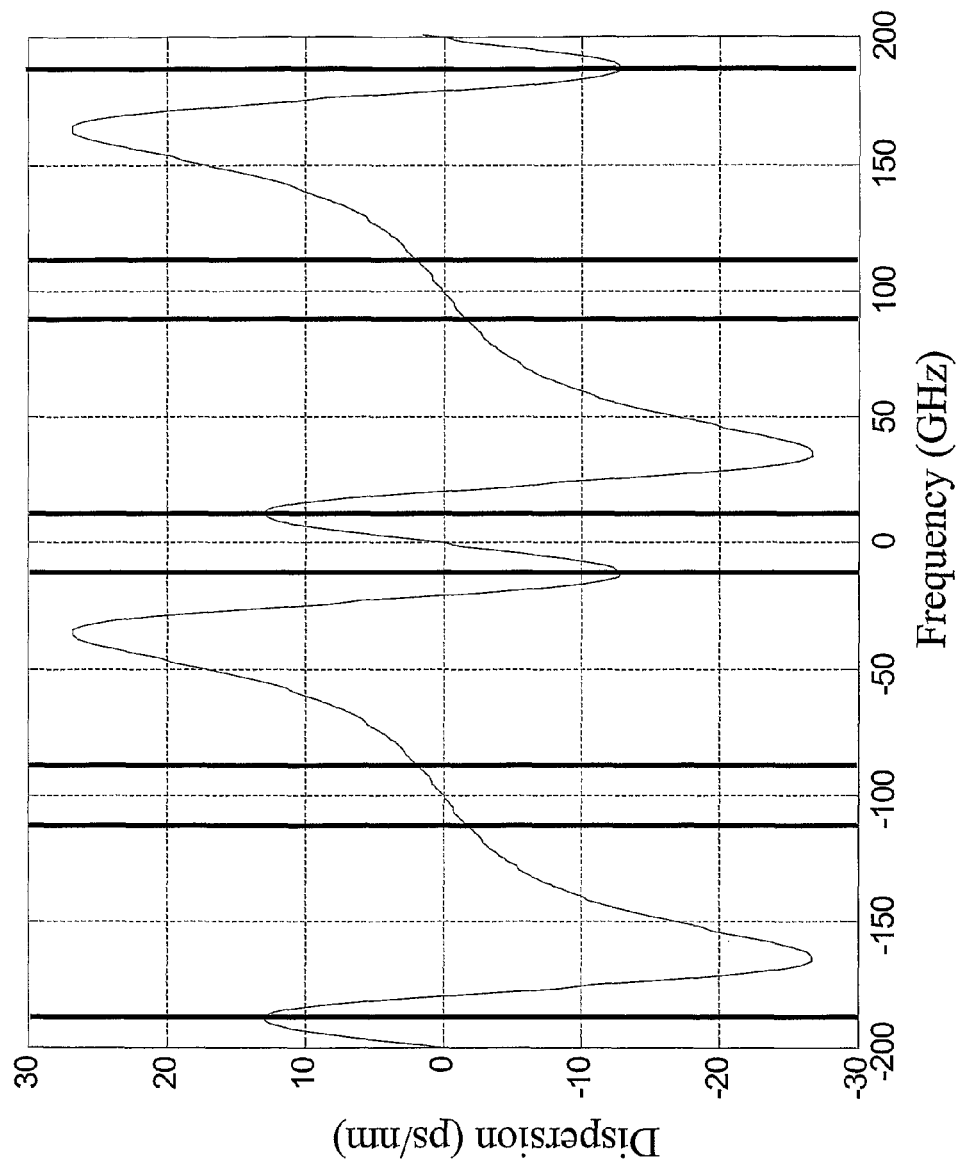

In FIG. 5, it is shown the corresponding dispersion response function of the exemplary optical splitter 210 described with reference to FIG. 4. Both the first and the second output port 214, 216 exhibit the same dispersion curve shown in FIG. 5. Here the zero frequency is the same of FIG. 4 described above. The channels at zero and ±200 GHz are channels in resonance with the microrings 218 and they have crossed the resonators 218, while those at ±100 GHz are non resonant channels which remain on the optical path 211/230. It can be seen that the dispersion introduced by the exemplary optical splitter 210 on the resonant channels (within the channel bandwidth of ±12.5 GHz around the central frequency of each channel) remains below 20 ps/nm, which is an acceptable limit even thought not negligible. On the other hand, the non-resonant channels are affected by a negligible dispersion. There is consequently an asymmetry between the channels that are non-resonant and the ones which are resonant, the latter being disadvantaged in terms of losses, polarization dependent loss and dispersion.

A maximum value of ±20 ps/nm of the dispersion added to the thru channels (by the whole optical device 200) is usually specified, while a more relaxed specification (i.e. ±80 ps/nm) is generally required for the dropped channel(s). This is because the dropped channel is usually immediately detected while the thru channels may travel through several OADM nodes before being detected so that dispersion accumulation has to be avoided. With reference to FIG. 3, it is noted that in case the optical combiner 220 had the same structure of the optical splitter 210 and it were tuned, or trimmed, so that its resonances would overlap with the resonances of the optical splitter 210, than the resonant channels, in operation, would first cross the resonators 218 of the splitter 210 and then those 225 of the combiner 220, as described in prior art, e.g. in U.S. Pat. No. 6,839,482. In this case, the non-resonant channels belonging to the first portion will propagate along the first optical path 230 and will pass thru the optical combiner 220 unaffected and will be output into the output port 228 corresponding to the first optical waveguide 221. The optical channels of the second portion in the second optical path 240 would be input to the input port 224 of the combiner and, being resonant with its microrings 225, they would travel across the latter and would be output at the same output port 228. Thus, as clear from FIGS. 4 and 5, they would be affected by twice the dispersion of FIG. 5 due to the microrings. The acquired dispersion of the resonant channels would sum up twice, thus reaching the maximum acceptable level, while non-resonant channels would be substantially unaffected. The thru output would be consequently strongly not equalized and would be difficult to meet the specification of the filter especially in term of dispersion.

According to the present invention, the combiner 220 is trimmed by the respective trimming device so that its resonances are detuned in frequency by one half of its FSR (e.g., 100 GHz detuning for a 200 GHz FSR) with respect to the resonances of the optical splitter 210. In other words, if the optical splitter 210 is configured so as to deviate, in operation, toward the optical path 240 the even channels, the optical combiner 220 is configured so as to deviate, in operation, the odd channels toward the optical path 240 and vice versa. The optical combiner 220 is trimmed so that its resonances are interleaved with those of the optical splitter 210. In other words, if the optical splitter 210 resonates at, e.g., the even channels, the optical combiner 220 is made to resonate, by the trimming device, at the odd channels. Accordingly, the non-resonant (with respect to the combiner 220) channels propagating along the second optical path 240 will not leave the optical path 240 and will be output into the output port 226 corresponding to the second optical path 240. The resonant (with respect to the combiner 220) channels in the first optical path 230 will propagate crosswise the resonators of the combiner 220 and will be also output into the same output port 226, as indicated by the thick arrows in FIGS. 2 and 3. Advantages of this particular configuration is that every single channel will propagate crosswise only either the optical splitter's resonator(s) or the optical combiner's resonator(s), thus having the result of an output WDM signal at the output port 226 with more homogeneous channels than in the prior art device, both in optical power (loss, PDL, etc.) and in optical distortion, such as phase distortion and/or dispersion. The discussion above equally applies to the optical device 200 of FIG. 2.

In the following, a particular configuration of the optical device 10 will be described, which is particularly suitable to add and/or drop a channel. Preferably, the free spectral range of the optical filter 260 is substantially equal to an odd multiple of the WDM frequency spacing and greater than half of the WDM optical bandwidth. In other words, the FSR of the optical filter 260 is given by: $FSR=(2k+1)\Delta f \pm \% \Delta f$, being $\Delta f$ the frequency spacing and k any positive integer such that $k>(BW-2\Delta f)/4 \Delta f$, being BW the optical bandwidth, or equivalently, $k>(N_{ch}-3)/4$, being $N_{ch}$ the number of allocated WDM channels. It is noted that $N_{ch}=BW/\Delta f+1$. The term 'substantially' used above takes into account the $\pm X \% \Delta f$ term, wherein X is less than or equal to 50 or, preferably, less than or equal to 40 or more preferably less than or equal to 25. The value of $\pm 50\% \Delta f$ may be suitable for a 10 Gbit/s NRZ or RZ channel bit-rate having 100 GHz or 50 GHz spacing. However this value may depend on transmission parameters such as the channel bit-rate and the frequency spacing and it is ultimately determined by the maximum allowable dispersion and/or loss on the channel near the parked resonance (see below). For a 40 Gbit/s NRZ or RZ channel bit-rate, a smaller value may be suitable, for example equal to $+25\% \Delta f$. For example, for a bandwidth equal to about BW=4000 THz and a frequency spacing equal to $\Delta f=100$ GHz (41 channels), than $FSR=(2k+1)100\pm 40$ GHz, with $k \geq 10$, e.g. $FSR=2100\pm 40$ GHz.

A further tunable optical filter 250 may advantageously be optically coupled to the first optical path 230. The optical filter 250 is advantageously a resonant optical filter having optical filtering functionality similar to those of the optical filter 260. The free spectral range of the further tunable resonant filter 250 is substantially equal to an odd multiple of the WDM frequency spacing and greater than half of the WDM optical bandwidth ($FSR=(2k+1)\Delta f \pm X \% \Delta f$, $k>(BW-2 \Delta f)/4 \Delta f$, or equivalently, $k>(N_{ch}-3)/4$ and $X\leq 50$ or $X\leq 40$).

Preferably, the FSR of at least one of the first and second optical filter 250, 260 exceeds the half of the optical bandwidth by a quantity greater than the frequency spacing. In other words, k is selected such that $k>BW/4\Delta f$ or equivalently $k>(N_{ch}-1)/4$. According to the Applicant, the optimal choice for k is $(N_{ch}-1)/4+1>k>(N_{ch}-1)/4$. Reasons for these selections will be given below. For example, for a bandwidth equal to about BW=4000 THz and a frequency spacing equal to $\Delta f=100$ GHz (41 channels), than $FSR=(2k+1)100\pm 40$ GHz, with preferably $k \geq 11$. According to the Applicant, the optimal choice for k is k=11, i.e. $FSR=23\pm 40$ GHz.

For reasons of easy of manufacture and operation, it could be preferable that the FSR of the further tunable optical filter 250 has the same characteristics of the FSR of the tunable filter 260. Preferably, the further optical filter has the same structure of the optical filter 260. Accordingly, in a preferred configuration both the optical filters have the respective FSR exceeding the half of the optical bandwidth by a quantity greater than the frequency spacing.

The particular filter configuration of the optical device 10 according to FIG. 3 allows the FSR of the two optical filter 250, 260 being advantageously smaller than said optical bandwidth, i.e. $k<(BW-\Delta f)/2\Delta f$, or equivalently $k<(N_{ch}-2)/2$. More preferably, k is selected so that $k<(3 BW-4\Delta f)/8\Delta f$, or equivalently $k<(3 N_{ch}-8)/8$. In the example above, advantageously, $k \leq 18$, and, more advantageously, $k \leq 13$.

Optionally, the further optical filter 250 has an associated by-pass path optically coupled to the first optical path 230 by way of respective optical switches in the same way as described above with respect to the optical filter 260. Analogously, an optional all-pass filter may be coupled to the bypass in the same way and with the same functions as described above with reference to all-pass filter 454.

The combination of the optical filters 250 and 260 is comprised in a filtering cell 299, e.g. a drop cell 299 having output port 256 and/or 266. The device 10 of FIG. 3 is particularly suitable to filter a plurality of independent optical channels arbitrarily chosen in the WDM grid, by way of suitably cascading a corresponding plurality of filtering cells 299 along the direction of propagation of the optical radiation in the optical paths 230 and 240. Each filtering cell 299 is apt to filter one channel arbitrarily selected within the whole WDM grid and independently from the channels filtered by the other cells 299. The cascade of filtering cells 299 is comprised, with respect to said direction of propagation, between the optical splitter 210 and the optical combiner 220. The advantage of this solution is that the thru channels pass across only either one of the splitter 210 and the combiner 220 only once, thus seeing limited overall dispersion by the device 10.

Exemplarily, the filter cell 299 of the device 10 is a tunable optical add and/or drop cell 299 wherein the resonant-type optical filters 250, 260 are tunable optical add and/or drop filters (OADF) 250, 260 comprising microring resonators. The optical filters 250 and 260 have exemplarily the same structure and the following description of the optical filter 260 equally applies to the optical filter 250 (wherein the first optical path 230 takes the place of the second optical path 240). The following description of the optical filter 260 equally applies to the optical filter 260 of the optical device 200 of FIG. 2. It is to be understood that the microring resonators of the embodiment of FIG. 3 may be replaced by any suitable resonator, such as racetracks, waveplates, etc. The optical filter 260 comprises a first stage adapted to drop (or add) a WDM channel from (or into) the optical path 240. The first stage comprises at least a microring 255 optically coupled to the optical path 240 and to a drop waveguide 267 in series configuration, which means that, in operation, the optical radiation resonant with the microring propagates from the optical path 240 to the microring and then to the drop waveguide 267. The drop port 266 of the optical filter 260 may belong to the drop waveguide 267, as shown in FIG. 3. In the exemplary embodiment of FIG. 3, the first stage of the tunable OADF 260 comprises a second microring 258 series-coupled with the first microring between the optical path 240 and the drop waveguide 267. Thus, in operation, the resonant optical radiation first propagates through the first microring and then through the second and finally through the drop waveguide 267. Advantageously, additional series-coupled microrings may be added within the first stage, e.g., in order to improve the roll-off of the drop function of the optical filter 260.

Optionally, additional microring-based filtering stages may be cascaded along the optical path 240 in order to improve the optical response of the optical filter 260. For example, each of them may be apt to 'clean' the thru channels (i.e. to further remove the resonant channel from the optical path 240) and/or to add a further channel, preferably equal to the dropped one, into the optical path 240, in case the first stage acts as a drop stage. In FIG. 3 a second and a third stage are exemplarily shown having a configuration and an operating point (i.e. resonance frequencies) identical to that of the first stage, so as to clean the thru channels.

Figure 6A:
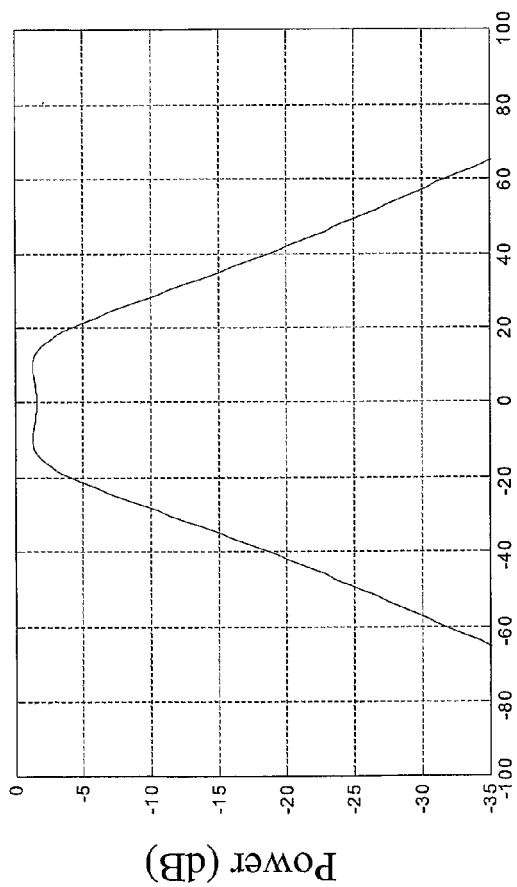
FIGS. 6A and 6B respectively show the calculated amplitude and dispersion response of the optical add and/or drop filter comprised in the device shown in FIG. 3.
Figure 6B:
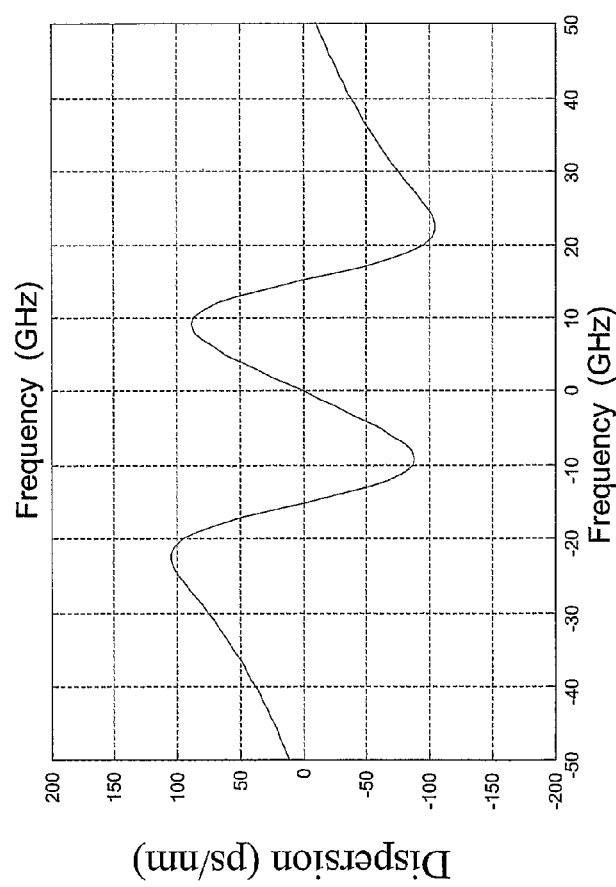

In FIGS. 6a and 6b there are respectively plot the calculated (transfer matrix method) amplitude and dispersion drop response at the drop port 266 of the three stages—two series-coupled microrings add and/or drop filter 260 described above. As in the previous examples (see FIGS. 4 and 5) silicon waveguides buried in a $SiO_2$ cladding were contemplated, but the OADF 260 can be realized by any suitable optical material system. Within each stage, the power coupling coefficients of the couplers between the bus-waveguides (240 or 267) and the waveguides constituting the microrings are equal to about 7.8% (suitable range 6.5%-8.5%) and the power coupling coefficient of the coupler between the two adjacent microrings is equal to about 0.21% (suitable range 0.19%-0.22%). The microring radius is equal to about 4.9(±1%) µm, which corresponds to a FSR equal to about 2300 GHz (18.4 nm around 1550 nm). The exemplarily designed second order Chebyshev optical filter 260 meets the following specifications: passband (at drop port 266) equal to about 35 GHz with drop loss less than about 3 dB, extinction (at drop port 266) on adjacent WDM channels (200 GHz spacing) greater than or equal to about 30 dB. In the exemplary embodiment of FIGS. 6A, 6B, the bus and the microring waveguides were wide respectively about 400 nm and 490 nm and high about 220 nm, the bus to ring gap was about 130 nm wide and the ring to ring gap was about 260 nm wide. All the other design parameters have been assumed equal to the previous examples (FIGS. 4 and 5).

The OADF 260 may be thermally tuned by micro-heater (not shown) placed above the microrings, e.g. over the $SiO_2$ upper cladding. Other known tuning techniques may be used, such as electro-optics, magneto-optics, opto-mechanical and the like.

In one embodiment, a tunable resonant all-pass filter comprising a single microring resonator 454 coupled to the bypass path 451 is adapted to be tuned to match the phase distortion introduced by the optical filter 260. The all pass filter 454 has the FSR substantially equal to the FSR of the tunable OADF 260 and the bus-to-ring power coupling coefficient substantially equal to the coupling coefficient of a single stage of the OADF 260 times the number of stages of the OADF 260 (three in the example above). The resulting power coupling coefficient for the above example is equal to about 23.4%.

Figure 7:
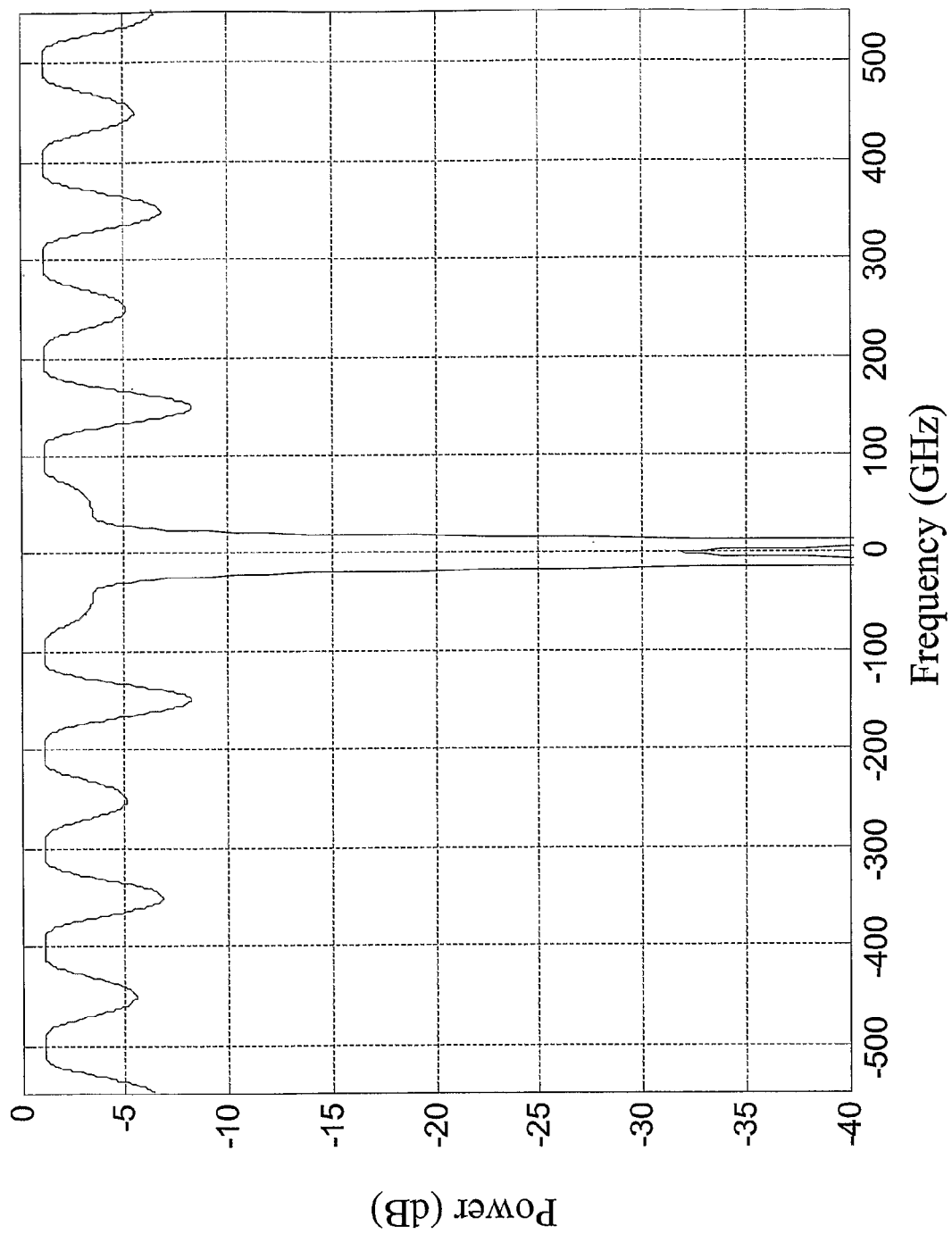
FIGS. 7 and 8 respectively show the calculated amplitude and dispersion response of the optical add and/or drop multiplexing device shown in FIG. 3.

FIG. 7 shows the power response at the output port 226 of the tunable OADM 10 exemplarily described with reference to FIGS. 3, 4, 5 and 6, wherein the combiner 220 has the resonances shifted by half FSR (i.e. one frequency spacing) with respect to the optical splitter 210, according to the present invention. The filter specifications are met: the extinction ratio at the drop channel is less than 30 dB and the insertion loss for the thru channels is about 1 dB.

Figure 8:
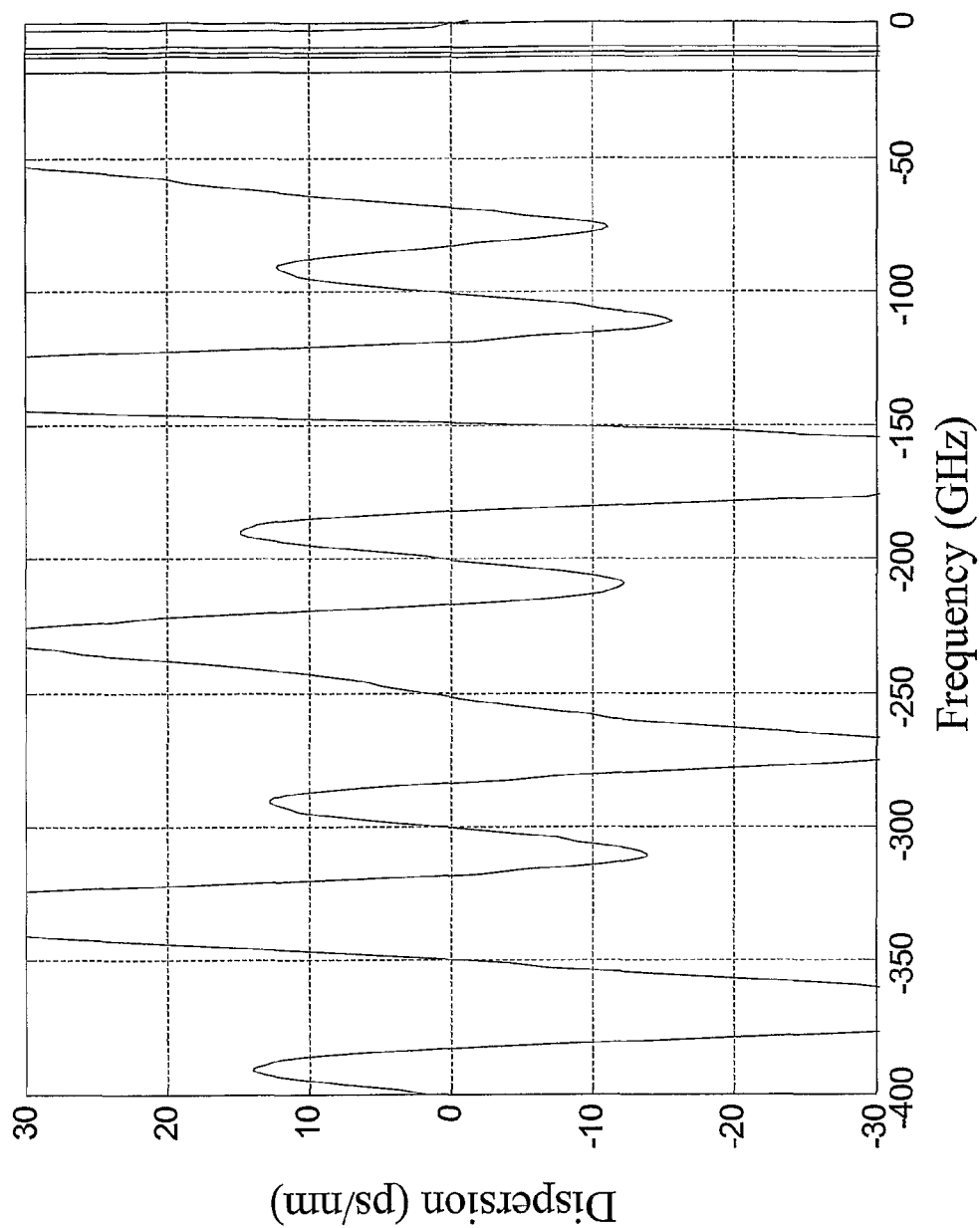

FIG. 8 shows the corresponding dispersion response at the output port 226. The dispersion specification of 20 ps/nm is met in correspondence of the thru channels.

In an embodiment, as shown in FIG. 3, the drop cell 299 may have a single drop port 298. This can be accomplished when the drop waveguide 257 of the OADF 250 and the drop waveguide 267 of the OADF 260 are the same waveguide. In other words, a common drop waveguide (257, 267) is optically coupled both to the drop stage of the OADF 250 and to the drop stage of the OADF 260. The drop port 298 may belong to this common waveguide. In this configuration, one of the two OADF (e.g. 260, as shown in FIG. 3) is placed downstream the other optical filter (e.g., 250) with respect to the direction of propagation of a dropped optical radiation along the common drop waveguide. In other words, OADF 260 is placed downstream the output port 256 of the optical filter 250. In this case, care should be taken that the downstream OADF does not insert in the optical path 240 the channel dropped by the upstream OADF, thus removing the dropped channel from the common drop waveguide. For this reason, it is preferable that the OADF having an FSR exceeding the half of the optical bandwidth by a quantity greater than the frequency spacing is the downstream OADF. In case the upstream OADF is dropping a channel at or near the center of the bandwidth, this solution allows parking the parked resonance of the downstream OADF on a channel having the same parity of the dropped channel but different from the latter. Moreover, a common drop waveguide allows a single drop port in presence of the two OADFs 250, 260 without adding loss to the dropped channel, which for example arises when using a conventional 3-dB coupler.

Optionally, a drop cleaning stage 270 may be coupled to the common drop waveguide (257, 267) to further clean the dropped channel. For example, the role of the drop cleaning stage may be to remove the residual optical power, if any, in correspondence of the "parked" resonance of one of the two OADFs 250, 260.

In the following, a method for optical filtering according to an embodiment of the present invention will be described. This method may be implemented by operation of the scheme of the optical device 10 of FIG. 3, described above. Where useful for the understanding of the method of the present invention, reference will be made to elements and corresponding reference numerals of FIG. 3, without restricting the scope of the method. The method is particularly suitable to filter at least an optical channel within a plurality of WDM channels, while leaving the thru channels with a minimum alteration or no alteration at all.

First, a WDM optical signal comprising a plurality of optical channels having respective optical frequencies lying on a grid ('WDM grid') of allocated frequencies equally spaced by a given frequency spacing, said grid occupying an optical bandwidth BW, is split by way of the optical splitter 210, into a first and a second portion spatially separated.

The first portion of the optical signal comprises a sub-group of said optical channels having optical frequencies lying on a first sub-grid having frequencies spaced by the double of said frequency spacing and the second portion comprises the remaining optical channels lying on a respective second sub-grid of frequencies. The first and second frequency sub-grids, respectively associated to the first and second portion, are complementary sub-grids of the grid of allocated WDM frequencies described above. Exemplarily, the first portion may comprise the channels having even parity and the second portion the channels having odd parity. In the following, the expression 'belonging to the first/second portion' is equivalent to the expression 'having first/second parity'. In each portion, the residual optical power of the channels substantially belonging to the other portion with respect to the optical power of the first portion channels ('cross-talk') is below −10 dB. Preferably, the cross-talk is below −15 dB, more preferably below −20 dB.

The optical splitter 210 is operated, during the splitting, so that its resonant structure 218 is tuned so as to resonate with the optical frequencies of the second sub-grid, i.e. the channels of the second portion overlaps the resonances of said resonant structure 218.

An initial channel belonging to the first or second portion is filtered, e.g. by way of an optical filter adapted to act solely on the first or second portion and tuned so that one of its resonances overlaps the optical frequency of said initial channel.

The first and second portions of optical channels are then recombined by way of the combiner 220. The optical combiner 220 is operated, during the combining, so that its resonant structure 225 is tuned so as to resonate with the optical frequencies of the first sub-grid, i.e. the channels of the first portion overlaps the resonances of said resonant structure 225.

Assuming the initial channel belongs to the first portion, preferably the optical filter 250 adapted to act solely on the first portion has one of the two adjacent resonances overlapping an optical frequency of the second sub-grid and the other adjacent resonance lies outside said optical bandwidth.

Figure 9A:
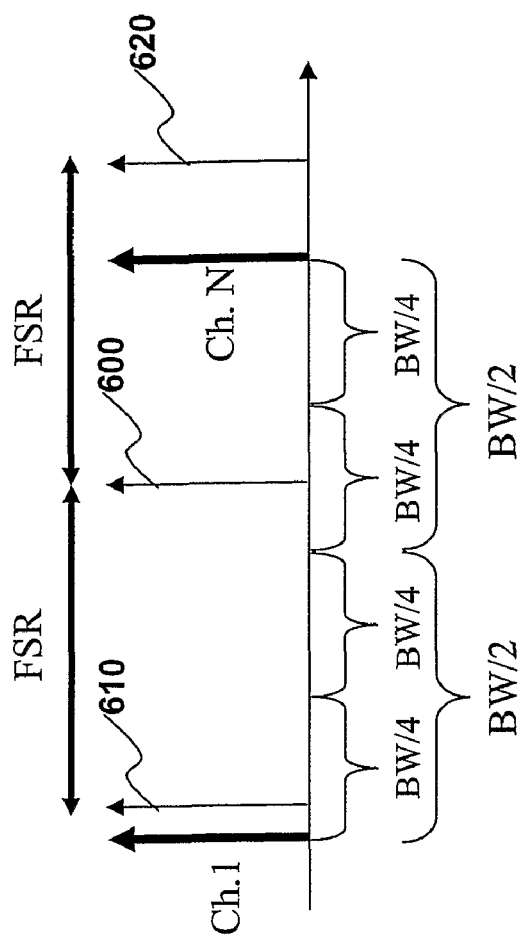
FIGS. 9A and 9B are schematic diagrams exemplary showing the operation of the device shown in FIG. 3.

This is pictorially illustrated in FIG. 9A, wherein the horizontal axis represents the optical frequency. The left thick arrow represents the first allocated optical frequency of the WDM grid (Channel 1, conventionally taken as the origin of the axis, i.e. at 0 GHz) and the right thick arrow that of the last allocated frequency (Channel N, exemplarily at 4000 GHz for the $41^{st}$ channel of a 100 GHZ spacing full-grid signal). The thin arrows represent the resonances of the optical filter 250. The arrow 600 represents the 'active resonance', i.e. that resonance referred to above which overlaps the optical frequency of the initial channel to be filtered belonging to the first portion. Exemplarily, the initial channel may be the $26^{th}$ (even) channel at 2500 GHz. An adjacent resonance 610 (called 'inactive resonance') overlaps any allocated optical frequency of the second sub-grid (exemplarily, assuming an FSR of the optical filter 250 equal to 2300 GHz, the optical frequency at 200 GHz, i.e. the odd third channel). This has the advantage that, owing to the fact that no or very small optical power (related to the cross-talk) is present at this resonant frequency, the optical filter 250 typically interacts weakly, or not at all, with the optical power in correspondence of this frequency. If this interaction is not negligible, additional measures may be taken, as described below. In addition, being the resonance 610 placed in between two adjacent even channels, they are not significantly affected in terms of amplitude, phase and dispersion by the optical filter 250.

The other adjacent resonance 620 (called 'out-of-band resonance') is made to lie outside the optical bandwidth occupied by the grid of allocated frequencies (exemplarily at frequency 2500+2300=4800 GHz) and consequently it does not interact with the optical channels.

Occasionally, depending on the value of the FSR, it may happen that also the first adjacent resonance is made to lie outside the optical bandwidth occupied by the grid of allocated frequencies, for example in case the initial filtered channel lies at or in the proximity (i.e. within the range ±|FSR−BW/2−Δf|) of the center bandwidth. In the example above, where FSR=2300 GHz and center bandwidth BW/2=2000 GHz, in case the even filtered channel lies in the range 1800-2200 GHz (i.e. 1900 or 2100 GHz), both the two adjacent resonances falls outside the WDM bandwidth.

The feature that the FSR of the first and second optical filter 250 and 260 of FIG. 3 is an odd multiple of the channel spacing and also greater than half of the occupied bandwidth, in combination with the first optical splitter splitting odd and even channels respectively to the first and second optical filter, allows to filter an arbitrary channel in an optical bandwidth while tuning the first and the second optical filter 250 and 260 by an FSR which may be smaller than said optical bandwidth (in the example above 2300 GHz instead of 4000 GHz for the second optical filter 260 and 2100 GHz or 2300 GHz for the first optical filter 250).

In case a by-pass path, with respective switches, is present, the filtering of the initial channel is accomplished by acting on the optical switches so as to maintain substantially all the optical radiation output from the output port 214 of the optical splitter 210 on the first optical path 230, so as to interact with the optical filter 250.

With reference to the second portion, at least one of the following two steps is performed.

1) The second portion is made to bypass a second optical filter 260, which is adapted to act solely on the second portion, and no interaction arises with it. This may be accomplished, with exemplary reference to FIG. 3, by properly actuating the switches 452 and 453 so as to direct the second portion to the bypass path 451. Preferably, the second optical filter 260 is tuned with one of its resonance in the proximity of the center of the WDM bandwidth. This solution 1) is preferable in case no all-pass filter 454 is present.

Figure 9B:
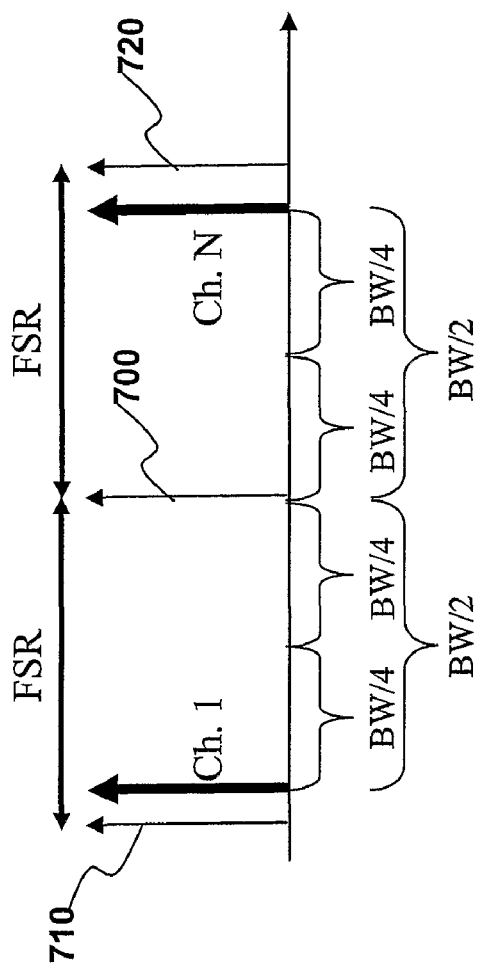

2) In case the second portion, e.g. by properly actuating the switches 452 and 453, is maintained onto the second optical path 240, the second optical filter 260 is tuned so that one of its resonances (referred to as the 'parked resonance') overlaps an optical frequency of the first sub-grid at or in the proximity of the center of the optical bandwidth of the WDM grid and the two respective adjacent resonances both lie outside said optical bandwidth ('out-of-band resonances'). This is pictorially illustrated in FIG. 9B, having the same conventional symbols of FIG. 9A. The thin arrows represent now the resonances of the optical filter 260. The arrow 700 represents the 'parked resonance' on top of an optical frequency of the first sub-group and the arrows 710 and 720 represent the two adjacent resonances which are made to lie outside the optical bandwidth occupied by the allocated frequencies grid and consequently they do not interact with the optical channels. Owing to the fact that no or very small optical power (related to the cross-talk) is present at the parked resonance frequency, the optical filter 260 typically interacts weakly, or not at all, with the optical power in correspondence of this frequency. If this interaction is not negligible, additional measures may be taken, as described further below.

In the example above, when also the second optical filter 260 has an FSR of about 2300 GHz, the parked resonance may correspond to the frequency of the $22^{nd}$ (even) channel at 2100 GHz or the $20^{th}$ channel at 1900 GHz in order to have both the two adjacent resonances falling outside the WDM bandwidth. This is the reason why the FSR of one of the two optical filters 250 and 260 (in the example above the second optical filter 260) is selected so as to exceed the half of the optical bandwidth by a quantity greater than the frequency spacing (k>BW/4Δf or equivalently k>($N_{ch}$−1)/4). In fact, assuming that the total number of allocated channels on the WDM grid is odd, in case the channel to be filtered is even, then the parked resonance of the inactive filter (i.e. the filter which is not filtering any channel and which is apt to act solely on the portion comprising the odd channels) needs to be parked on an even channel near the central frequency (which corresponds to an odd channel) of the bandwidth. Assuming the best case of an even channel adjacent to the central channel, the smallest distance from the two ends of the bandwidth is equal to half of the optical bandwidth plus the frequency spacing and thus the FSR of this filter preferably exceeds this quantity (e.g. FSR=BW/2+2Δf). On the other end, in case the channel to be filtered is odd, then the parked resonance of the inactive filter (i.e. the filter apt to act solely on the portion comprising the even channels) needs to be parked on an odd channel which may be advantageously chosen as that corresponding exactly to the central frequency of the bandwidth. In this case, it is enough that the FSR of this optical filter (in the example above the first optical filter 250) exceeds the half of the optical bandwidth (e.g. FSR=BW/2+Δf).

In case the total number of allocated channels on the WDM grid is even, by suitably selecting the respective parked resonance as close as possible to the center of the WDM bandwidth, it is sufficient that the FSR of both the optical filters 250 and 260 is greater than half of the bandwidth (in addition to be an odd multiple of the channel spacing). For example, given a bandwidth BW=3900 GHz and a frequency spacing equal to Δf=100 GHz (40 channels), than FSR=(2k+1) 100±40 GHz, with k≧10. According to the Applicant, the optimal choice for k is k=10, i.e. FSR=2100±40 GHz.

Regarding the choice of performing step 1) or 2) above, it depends on the presence or not of the by-pass paths of FIG. 3, with or without the all-pass filters, and on trade-off considerations. In case the by-pass arm 451 is present without the all-pass filter 454 (e.g. because it is not strictly necessary for having hitless switching), then it is preferable, according to the Applicant, to perform step 1) above because in this case the channels belonging to the second portion do not interact with the optical filter 260 and they are not affected by additional distortion along the by-pass path 551.

If the all-pass filter 454 is present for hitless purpose, then an optimal solution should be found choosing the lower between the dispersion introduced by the all-pass filter on the thru channels (of the second portion) when the optical filter is by-passed and the distortion (loss and/or dispersion) introduced by the optical filter on the thru channels adjacent the parked resonance when it is not by-passed.

In case the channel to be filtered need to be changed from the initial channel to a final channel (i.e. tuning of the optical device 10), the following steps may be preferably performed. Preferably, the initial and final channels are switched off. In case the final channel belongs to the same portion of the initial channel, i.e. the first portion, it is sufficient to tune, preferably hitlessly (see below), the first optical filter until one among the previously active resonance 600, the previously inactive resonance 610 or the other adjacent resonance 620 overlaps the final channel, depending on the relative position between the frequency of the final channel and those resonances. For example, the resonance 610 may be used to span over the (first portion frequencies in the) first half of the bandwidth and the resonance 600 to span over the (first portion frequencies in the) second half of the bandwidth. The second optical filter 260 may not need to be tuned, being already parked (or by-passed) on a proper frequency.

It will now be assumed that the final channel belongs to the second portion, i.e. the other portion with respect to the initial channel.

The second optical filter 260 is tuned until one of its resonances ('active resonance') overlaps the optical frequency of the final channel, one of the two adjacent resonances ('inactive resonance') overlaps an optical frequency of the first sub-grid and the other adjacent resonance is an out-of-band resonance. Occasionally, it may happen that also the first adjacent resonance is made to lie outside the optical bandwidth. The choice of the active resonance depends on the relative position between the frequency of the final channel and the resonances, as described above.

Preferably, the step above of tuning the second optical filter is performed hitlessly, e.g. exploiting the by-pass path 454. Assuming the case of step 1) above (optical filter 260 by-passed), at the end of the tuning of the optical filter 260 the second portion is redirected to the second optical path 240 by way, e.g. of the synchronous switches 452 and 453. In the further case of using an all-pass filter 454, this is tuned, before having completely actuated the switches 452 and 453, so as to match the phase distortion introduced by the optical filter 260, at least in correspondence of the WDM channels neighboring the final one. This phase matching is achieved at least for the two channels immediately adjacent, and having the same parity of, the processed one. Typically, no phase matching is achieved at the frequency of the final channel. Typically, the all-pass filter 454 is tuned until one of its resonant wavelengths overlaps the frequency of the final channel on which it is also being tuned the optical filter 260. Then, the optical switches 452 and 453 may be synchronously switched so as to direct the WDM second portion from the by-pass path 451 to the second optical path 240. In all the intermediate states during the switching operation, the two fractions of the second portion propagating respectively along the two optical paths remain in a phase relationship which is suitable to properly recombine in the optical switch 453 so as to be entirely outputted in the proper output port (corresponding to the optical path 240) of the optical switch 453 without loss and/or distortion.

Assuming the case of step 2) above (optical filter not by-passed), the second portion may be first redirected to the by-pass path (possibly exploiting the all-pass filter 454 as described above), then the optical filter 260 is tuned (e.g., the parked resonance 700 may be tuned so as to become an active resonance on a channel belonging to the second portion) and then the procedure of redirection described above may be applied.

With reference to the first portion, at least one of the following two steps is performed.

A) The first portion is made to bypass the first optical filter 250 so that no interaction arises. This may be accomplished, e.g., by properly actuating the respective switches so as to direct the first portion to the respective bypass path. Preferably, the first optical filter 250 is tuned with one of its resonance in the proximity of the center of the WDM bandwidth. This solution A) is preferable in case no respective all-pass filter is present.

B) The first optical filter 250 is tuned until one of its resonances ('parked resonance') overlaps an optical frequency of the second sub-grid at or in the proximity of the center of the optical bandwidth of the WDM grid and the two respective adjacent resonances both lie outside said optical bandwidth and consequently they do not interact with the optical channels. The same considerations above with regard to the FSR of the optical filter 260 and the hitless tuning may be applied to the optical filter 250. Again, owing to the fact that no or very small optical power (related to the cross-talk) is present at the parked resonance frequency, the optical filter 250 typically interacts weakly, or not at all, with the optical power in correspondence of this frequency. If this interaction is not negligible, additional measures may be taken, as described above with reference to stage 270 of FIG. 3.

Optionally, in case they were switched-off, the initial and final channels are now switched-on. Said final channel is now filtered by way of said second optical filter 260; for example it may be dropped.

During the entire operation, the thru channels remain substantially unaffected.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. An optical device comprising:
an optical splitter having an input port, a first output port, a second output port and a resonant structure comprising at least a resonator, the optical splitter being adapted to receive at said input port an optical signal comprising a plurality of channels lying on a grid of optical frequencies equally spaced by a frequency spacing and occupying an optical bandwidth, and wherein said optical splitter is adapted to output at said first and second output ports, respectively, a first and a second portion of said optical signal, said second portion comprising the channels lying on a second sub-grid of optical frequencies spaced by an integer multiple of said frequency spacing and the first portion comprising the remaining channels lying on a first sub-grid, wherein the resonant structure is capable of resonating with the optical frequencies of the second portion so that, in operation, the second portion is output at the second output port by interaction with the resonant structure;
an optical combiner having a first input port, a second input port, and an output port and adapted to receive at said first and second input ports, respectively, the first and the second portion and to output the first and second portions at said output port;
a first optical path optically connecting the first output port of the optical splitter to the first input port of the optical combiner and capable of propagating said first portion;
a second optical path optically connecting the second output port of the optical splitter to the second input port of the optical combiner and capable of propagating said second portion; and
an optical filter optically coupled to the second optical path and capable of filtering a channel within said second portion propagating through the second optical path,
wherein the optical combiner comprises at least one resonant structure comprising at least a resonator and is capable of resonating with the optical frequencies of the first portion so that, in operation, the first portion is output at said output port by interaction with said at least one resonant structure.

2. The optical device of claim 1, wherein the optical combiner comprises a plurality of resonant structures, wherein each resonant structure comprises at least a resonator and said resonant structure is capable of resonating with the optical frequencies of a respective sub-portion of the first portion so that, in operation, the respective sub-portion is output at said output port by interaction with the respective resonant structure, each respective sub-portion being different from other sub-portions.

3. The optical device of claim 2, wherein:
the optical splitter further comprises a first optical waveguide optically connecting the input port to the first output port and a second optical waveguide optically connected to the second output port, wherein said resonant structure is optically coupled to the first and second optical waveguides and is optically interposed between the first and the second optical waveguides so that, in operation, the second portion propagates through the resonant structure while being directed from the first optical waveguide to the second optical waveguide; and
the optical combiner further comprises a respective first optical waveguide optically connected to the first input port and a respective second optical waveguide optically connecting the second input port to the output port, wherein the resonant structures are optically coupled to the respective first and second optical waveguides in parallel configuration, and each one of the resonant structures is optically interposed between the respective first and second optical waveguides so that, in operation, the respective sub-portion of the first portion propagates through the resonant structure while being directed from the respective first optical waveguide to the respective second optical waveguide.

4. The optical device of claim 2, wherein the number of said plurality of resonant structures of the optical combiner is equal to said integer multiple diminished by one unit and said integer multiple is greater than two.

5. The optical device of claim 1, wherein said integer multiple is equal to two.

6. The optical device of claim 1, wherein each sub-portion of the first portion comprises the channels lying on a sub-grid of optical frequencies spaced by said integer multiple of said frequency spacing.

7. The optical device of claim 1, wherein each one of the resonant structures comprises a respective tuning device.

8. The optical device of claim 1, wherein the resonant structures share a common tuning device.

9. The optical device of claim 1, wherein the free spectral range of said optical filter is substantially equal to a further integer multiple of said frequency spacing, said further integer multiple not having common dividers with said integer multiple.

10. The optical device of claim 1, wherein said optical filter is an add and/or drop filter comprising a respective optical port adapted to drop or add an optical channel within the second portion.

11. The optical device of claim 9, wherein said optical filter comprises at least a resonator optically coupled to, and interposed between, the second optical path and a drop waveguide so as to be capable of dropping said optical channel within the second portion from the second optical path toward said drop waveguide.

12. The optical device of claim 1, wherein said optical bandwidth is greater than or equal to about 2 THz.

13. The optical device of claim 1, wherein said optical filter comprises micro-ring or racetrack resonators.

14. An optical communication system comprising a transmitter, a receiver, an optical line optically connecting the transmitter and the receiver and an optical device according to claim 1, wherein the optical device is coupled to the optical line.

15. A method for filtering an optical signal comprising a plurality of channels lying on a grid of optical frequencies equally spaced by a given frequency spacing and occupying an optical bandwidth, comprising:
a) splitting said optical signal by way of an optical splitter having an input port, a first output port, a second output port, and a resonant structure, comprising at least a resonator, wherein said optical signal is input at said input port and a first portion of the optical signal is output at said first output port, and a second portion of said optical signal is output at the second output port, said second portion comprising the channels lying on a second sub-grid of optical frequencies spaced by an integer multiple of said frequency spacing and overlapping the resonances of said resonant structure and the first portion comprising the remaining channels lying on the first sub-grid;
b) filtering a channel belonging to the first or second portions; and c) after filtering, recombining said first portion and second portion by way of an optical combiner having a first input port, a second input port, a respective output port, and at least one resonant structure comprising at least a resonator, wherein the first portion is input at said first input port, the second portion is input at said second input port, and both the first and the second portions are output at said respective output port, the channels of the first portion having optical frequencies overlapping the resonances of said at least one respective resonant structure of the optical combiner.

16. The method of claim 15, wherein:
said optical splitter further comprises a first optical waveguide optically connecting the input port to the first output port and a second optical waveguide optically connected to the second output port, and wherein the resonant structure is optically coupled to the first and second optical waveguides and optically interposed between the first and the second optical waveguides so that the second portion is output at the second output port after crossing the resonant structure; and
said optical combiner further comprises a respective first optical waveguide optically connected to the first input port and a respective second optical waveguide optically connecting the second input port to the respective output port, and wherein the at least one respective resonant structure is optically coupled to the respective first and second optical waveguides and optically interposed between the respective first and second optical waveguides so that the first portion is output at said respective output port after crossing the at least one respective resonant structure.

17. The method of claim 15, wherein the resonant structure of the optical splitter comprises a plurality of series-coupled resonators.

18. The method of claim 15, wherein said at least one resonator of the resonant structure of the optical splitter and/or of the optical combiner is a micro-ring or racetrack resonator.

19. The method of claim 15, wherein the optical combiner has the same type and number of resonators of the optical splitter.

20. The method of claim 15, wherein the step of filtering is performed on the second portion by way of an optical filter adapted to act solely on the second portion and configured so that one of its resonances overlaps the optical frequency of said filtered channel, one of the two adjacent resonances overlaps an optical frequency of the first sub-grid, and the other adjacent resonance lies outside said optical bandwidth.

21. The method of claim 20, wherein the distance between said one resonance of said optical filter and each one of said two adjacent resonances exceeds half of the optical bandwidth.

22. The method of claim 21, wherein the distance between said one resonance of said optical filter and each one of said two adjacent resonances exceeds half of the optical bandwidth by more than said frequency spacing.

23. The method of claim 20, wherein the optical filter comprises at least a resonator optically coupled to, and interposed between, an optical path and a drop waveguide so that the step of filtering comprises dropping said channel within the second portion from said optical path toward said drop waveguide.

24. The method of claim 15, wherein said integer multiple is equal to two.

25. The method of claim 24, further comprising at least one of the two following steps:
making the first portion bypass a further optical filter adapted to act solely on the first portion; and
configuring said further optical filter so that one resonance of the optical filter overlaps an optical frequency of the second sub-grid near the center of said optical bandwidth and the two respective adjacent resonances both lie outside said optical bandwidth.

26. The method of claim 25, wherein the further optical filter comprises at least a respective resonator optically coupled to, and interposed between, a further optical path and a respective drop waveguide so as to be capable of dropping an optical channel within the first portion from the further optical path toward said respective drop waveguide.

27. The method of claim 26, wherein the drop waveguide of the further optical filter and the drop waveguide of the optical filter are the same waveguide so that the further optical filter and the optical filter share the same drop waveguide.

28. The method of claim 25, wherein the further optical filter has the same structure of the optical filter.

29. The method of claim 15, wherein said optical bandwidth is greater than or equal to about 1 THz.

30. The method of claim 15, wherein step c) of filtering the channel comprises dropping said channel.

* * * * *